(12) United States Patent  
Takeuchi et al.

(10) Patent No.: US 8,319,469 B2
(45) Date of Patent: Nov. 27, 2012

(54) BRUSHLESS ELECTRIC MACHINE

(75) Inventors: Keshatoshi Takeuchi, Shiojiri (JP); Mamoru Sugimoto, Chino (JP); Yojiro Okakura, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/299,667

(22) Filed: Nov. 18, 2011

(65) Prior Publication Data

US 2012/0062162 A1 Mar. 15, 2012

Related U.S. Application Data

(63) Continuation of application No. 13/004,494, filed on Jan. 11, 2011, now Pat. No. 8,080,967, which is a continuation of application No. 12/104,725, filed on Apr. 17, 2008, now Pat. No. 7,906,930.

(30) Foreign Application Priority Data

Apr. 26, 2007 (JP) ................................. 2007-117218
Jan. 8, 2008 (JP) ................................. 2008-001571

(51) Int. Cl.
*H02K 41/00* (2006.01)
(52) U.S. Cl. ..................... 318/687; 318/135; 310/12.24; 310/181; 310/12.21
(58) Field of Classification Search .................. 318/687, 318/38, 135, 400.01; 310/156.43, 154.28, 310/154.29, 12.18, 12.21, 12.22, 12.24, 12.25, 310/12.26, 12.28, 67 R, 112–114, 268, 179, 310/181, 266
See application file for complete search history.

(56) References Cited

U.S. PATENT DOCUMENTS

| 4,564,778 | A | | 1/1986 | Yoshida |
| 4,639,084 | A | * | 1/1987 | Kugioka ........................ 359/824 |
| 4,908,533 | A | | 3/1990 | Karita et al. |
| 5,414,331 | A | | 5/1995 | Izawa et al. |
| 5,945,766 | A | * | 8/1999 | Kim et al. ...................... 310/268 |
| 6,617,734 | B2 | | 9/2003 | Taniguchi et al. |
| 6,691,000 | B2 | | 2/2004 | Nagai et al. |
| 7,230,356 | B2 | | 6/2007 | Kimura et al. |
| 7,417,343 | B2 | | 8/2008 | Lindberg et al. |
| 7,501,730 | B2 | | 3/2009 | Kimura et al. |
| 7,646,126 | B2 | * | 1/2010 | Trzynadlowski et al. .... 310/168 |
| 7,888,839 | B2 | * | 2/2011 | Gabrys et al. ................. 310/266 |
| 8,120,224 | B2 | * | 2/2012 | Trzynadlowski et al. .... 310/168 |
| 2004/0119366 | A1 | | 6/2004 | Hosaka |

(Continued)

FOREIGN PATENT DOCUMENTS

JP 62-208408 9/1987

(Continued)

*Primary Examiner* — Eduardo Colon Santana
(74) *Attorney, Agent, or Firm* — Harness, Dickey & Pierce, P.L.C.

(57) ABSTRACT

The brushless electric machine includes a first drive member (30U) having a plurality of permanent magnets (32U); a second drive member (10) having a plurality of electromagnetic coils and capable of movement relative to the first drive member (30U); and a third drive member (30L) disposed at the opposite side from the first drive member (30U) with the second drive member (10) therebetween. The second drive member (10) has magnetic sensors (40A, 40B) for detecting the relative position of the first and second drive members. The third drive member (30L) has at locations facing the permanent magnets of the first drive member (30U) a plurality of magnetic field strengthening members (32L) for strengthening the magnetic field at the location of the second drive member (10) in conjunction with the permanent magnets.

9 Claims, 29 Drawing Sheets

U.S. PATENT DOCUMENTS

| | | |
|---|---|---|
| 2005/0012475 A1 | 1/2005 | Takeuchi |
| 2006/0017884 A1 | 1/2006 | Goodhill et al. |
| 2006/0038460 A1* | 2/2006 | Bojiuc .................. 310/198 |
| 2006/0119300 A1 | 6/2006 | Armstrong |
| 2006/0266146 A1 | 11/2006 | Waide |
| 2007/0234552 A1 | 10/2007 | Nozawa et al. |
| 2008/0100151 A1 | 5/2008 | Takeuchi |
| 2008/0246424 A1 | 10/2008 | Takeuchi et al. |
| 2009/0066275 A1 | 3/2009 | Takeuchi |
| 2009/0085412 A1 | 4/2009 | Takeuchi |
| 2009/0096310 A1 | 4/2009 | Takeuchi |
| 2009/0134723 A1 | 5/2009 | Takeuchi |
| 2010/0052458 A1 | 3/2010 | Takeuchi et al. |
| 2011/0291532 A1* | 12/2011 | Takeuchi et al. ............ 310/68 B |

FOREIGN PATENT DOCUMENTS

| | | |
|---|---|---|
| JP | 62-272852 | 11/1987 |
| JP | 01-174253 | 7/1989 |
| JP | 07-213041 | 8/1995 |
| JP | 08-023665 | 1/1996 |
| JP | 10248288 A | 9/1998 |
| JP | 2001-298982 | 10/2001 |
| JP | 2003-136450 | 5/2003 |
| JP | 2006-006003 | 1/2006 |
| JP | 2006-006032 | 1/2006 |
| WO | 2005-089327 | 9/2005 |

* cited by examiner

Fig.4A
Forward rotation
Immediately before phase = 0
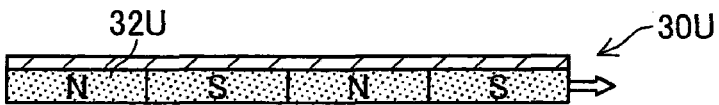
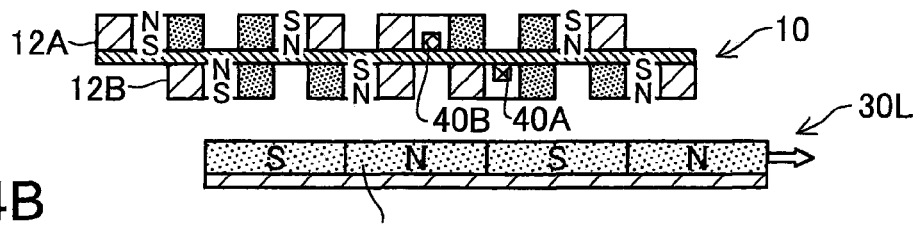
Fig.4B
Immediately before phase = π/2
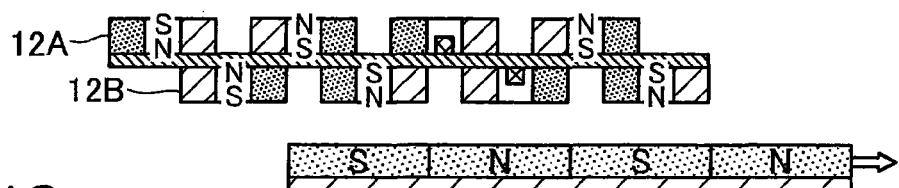
Fig.4C
Immediately before phase = π
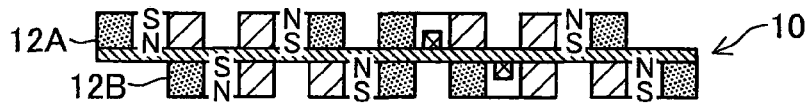
Fig.4D
Immediately before phase = 3π/2
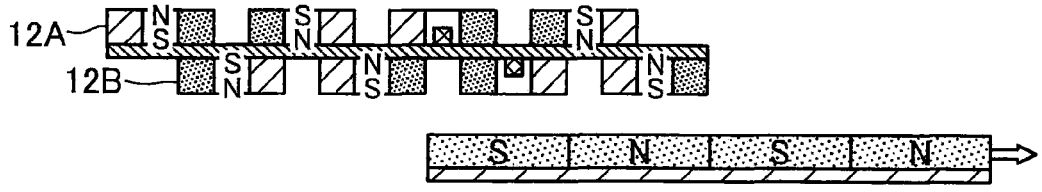

Reverse rotation

Immediately before phase = 0

Immediately before phase = $\pi/2$

Immediately before phase = $\pi$

Immediately before phase = $3\pi/2$

Fig.6

| PREFERRED APPLICATION | PERMANENT MAGNET | ROTOR MATERIAL | BOBBIN MATERIAL | CASE MATERIAL |
|---|---|---|---|---|
| COST | FERRITE | TYPICAL RESIN | TYPICAL RESIN | TYPICAL RESIN |
| SIZE | HIGH-COST MAGNET | TYPICAL RESIN | TYPICAL RESIN | TYPICAL RESIN |
| POWER CONSUMPTION | HIGH-COST MAGNET | TYPICAL RESIN | TYPICAL RESIN | TYPICAL RESIN |
| VIBRATIONS AND SHOCKS | HIGH-COST MAGNET | CARBON-TYPE RESIN, CERAMICS | CARBON-TYPE RESIN, CERAMICS | CARBON-TYPE RESIN, CERAMICS |
| TEMPERATURE | FERRITE | CARBON-TYPE RESIN | CARBON-TYPE RESIN | CARBON-TYPE RESIN |
| LIGHT WEIGHT | HIGH-COST MAGNET | CARBON-TYPE RESIN | CARBON-TYPE RESIN | CARBON-TYPE RESIN |
| TORQUE | HIGH-COST MAGNET | METAL, CARBON-TYPE RESIN, CERAMICS | CARBON-TYPE RESIN, CERAMICS | CARBON-TYPE RESIN, CERAMICS |
| ROTATION | HIGH-COST MAGNET | CARBON-TYPE RESIN | CARBON-TYPE RESIN, CERAMICS | CARBON-TYPE RESIN, CERAMICS |
| ENVIRONMENT | FERRITE | NATURAL MATERIAL | NATURAL MATERIAL | NATURAL MATERIAL |

Fig.8
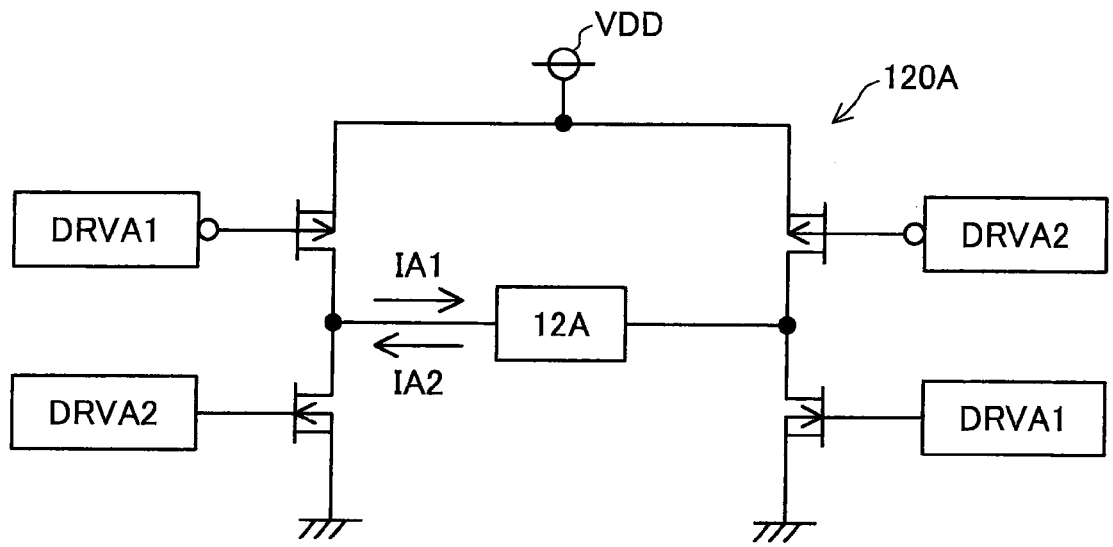
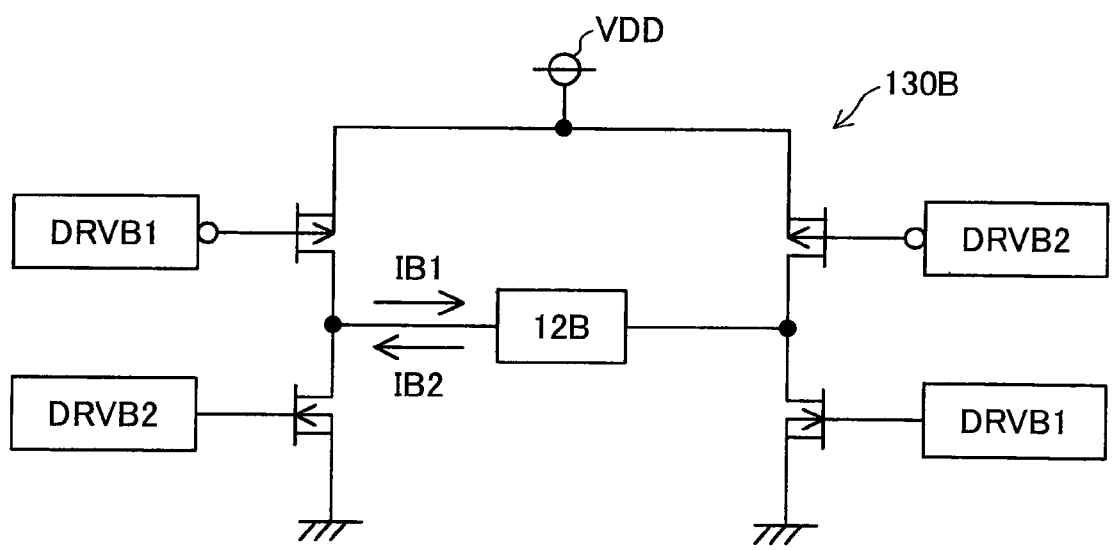

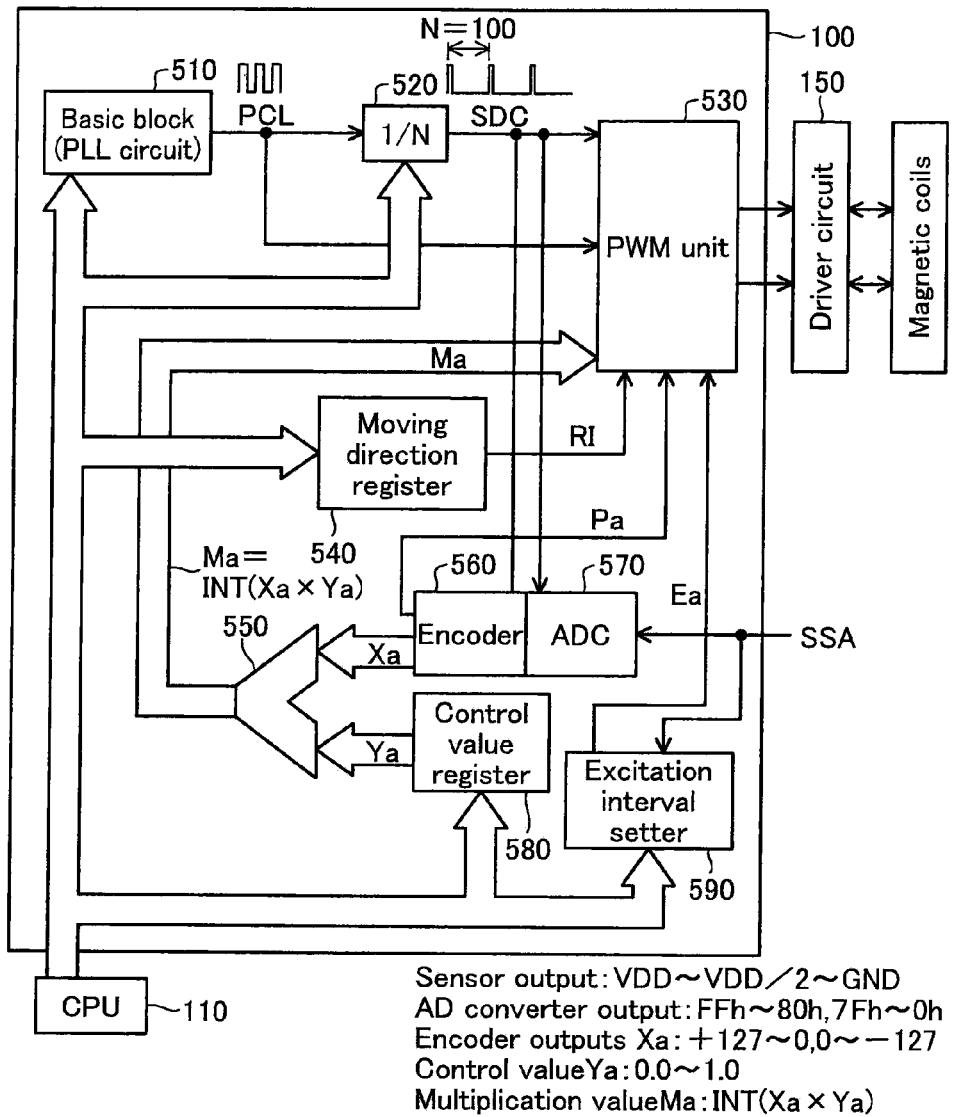

Fig.10A
SSA
Fig.10B
DRVA1+DRVA2
HiZ
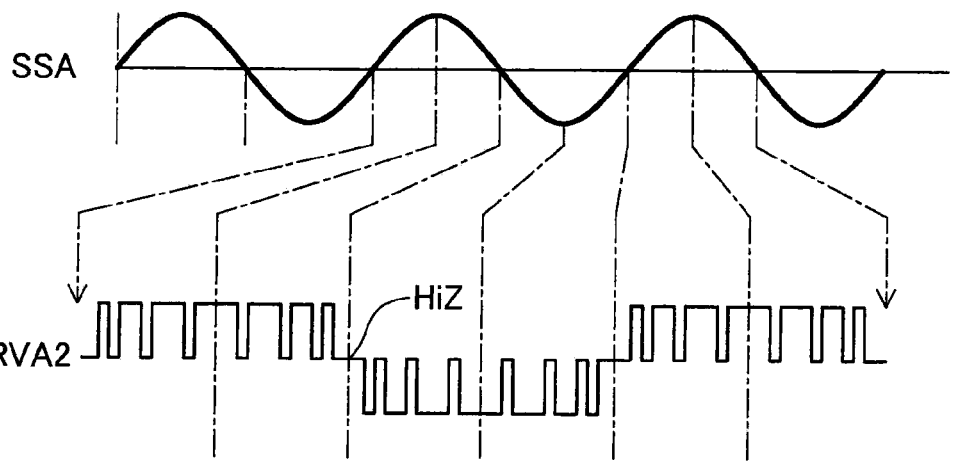
Fig.10C
Excitation interval EP
Non-excitation interval NEP
EP   NEP   EP
DRVA1+DRVA2
HiZ
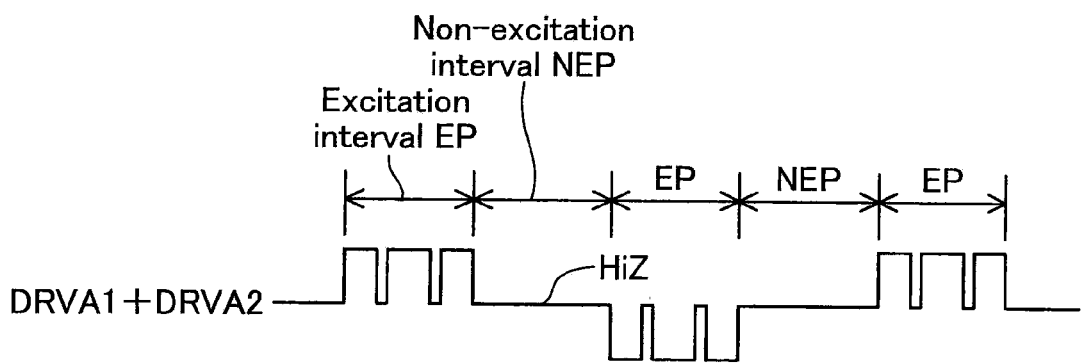

During reverse rotation (RI = "H")

Driving by rectangular wave

Current attenuates in association with increased speed

Driving by sine wave

Current attenuates in association with increased speed

Fig.16
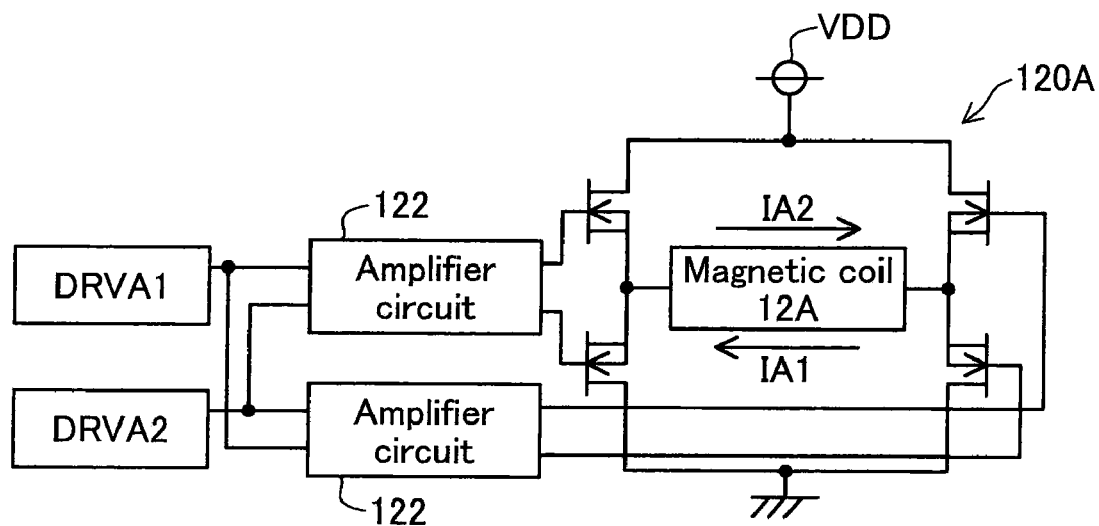
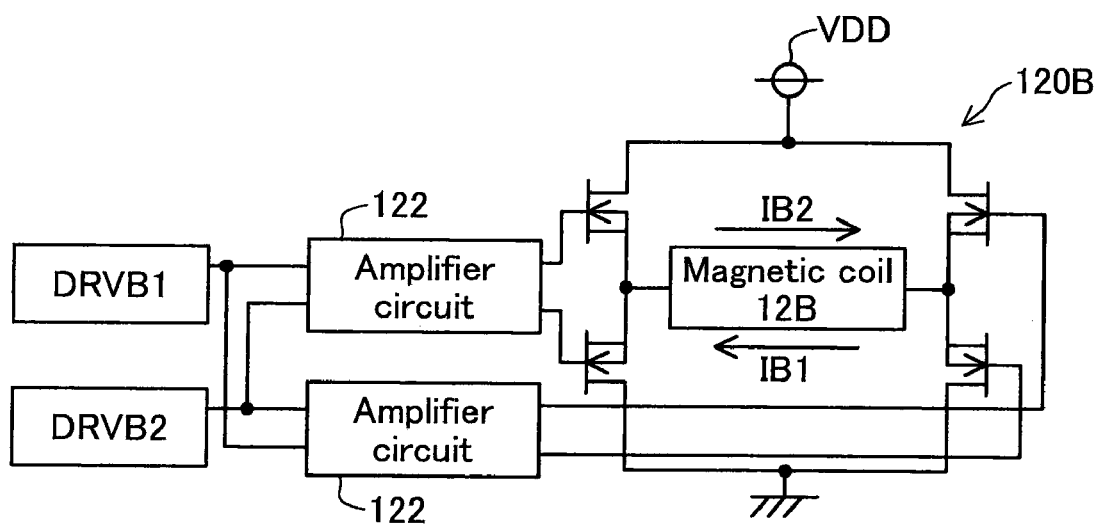

Very low voltage drive characteristics
(stable rotation characteristics in unloaded state)

Forward rotation

Immediately before
phase = 0

Immediately before
phase = 2π/3

Immediately before
phase = 4π/3

Forward rotation

Immediately before phase = 0

Immediately before phase = $\pi/2$

Immediately before phase = $\pi$

Immediately before phase = $3\pi/2$

BRUSHLESS ELECTRIC MACHINE

CROSS-REFERENCE TO RELATED APPLICATIONS

This is a continuation application of U.S. Ser. No. 13/004,494 filed Jan. 11, 2011 now U.S. Pat. No. 8,080,967, which is a continuation of Ser. No. 12/104,725 filed Apr. 17, 2008, now U.S. Pat. No. 7,906,930 issued Mar. 15, 2011, which claims the priority based on Japanese Patent Applications No. 2007-117218 filed on Apr. 26, 2007 and No. 2008-001571 filed on Jan. 8, 2008, the disclosures of which are hereby incorporated by reference in their entireties.

BACKGROUND OF THE INVENTION

1. Field of the Invention

The present invention relates to a brushless electric machine that utilizes permanent magnets and electromagnetic coils.

2. Description of the Related Art

The brushless motor disclosed in JP 2001-298982A is one known examples of a brushless electric machine that utilizes permanent magnets and electromagnetic coils.

FIG. 26 is a conceptual illustration showing an exemplary configuration of a conventional brushless motor. The brushless motor includes an electromagnetic coil array 12 and a magnet array 32. A magnetic field is shown in exemplary fashion in proximity to the magnet array 32. In this conventional brushless motor the magnetic field produced by the permanent magnets is open, and a resultant problem is fairly low efficiency of utilization of the magnetic field by the electromagnetic coil array 12. This problem is not limited to motors but is common to generators; it is a problem shared by brushless electric machines in general.

SUMMARY OF THE INVENTION

An object of the present invention is to provide technology for increasing magnetic field utilization efficiency in a brushless electric machine, and for improving efficiency of the electric machine.

According to an aspect of the present invention, there is provided a brushless electric machine, which includes: a first drive member having a plurality of permanent magnets; a second drive member having a plurality of electromagnetic coils, and capable of movement relative to the first drive member; a third drive member disposed to an opposite side from the first drive member with the second drive member therebetween, and having a fixed relative positional relationship with the first drive member; a magnetic sensor, disposed on the second drive member, for detecting relative position of the first and second drive members; and a control circuit for controlling operation of the brushless electric machine, based on an output signal of the magnetic sensor. The third drive member has at locations facing the permanent magnets of the first drive member a plurality of magnetic field strengthening members for strengthening the magnetic field at the location of the second drive member in conjunction with the permanent magnets.

According to this configuration, the permanent magnets and the magnetic field strengthening members collectively strengthen the magnetic field so that utilization efficiency of the magnetic field by the permanent magnets will be increased, thereby increasing efficiency of the electric machine.

The present invention may be reduced to practice in various forms, for example, as a brushless motor or a brushless generator; a method for control (or driving method) therefor; an actuator or generator system employing the same; and so on.

BRIEF DESCRIPTION OF THE DRAWINGS

FIGS. 4A-4D illustrate forward rotation operation of the brushless motor of Embodiment 1;

FIG. 6 shows the relationships among electric machines and preferred materials in the embodiment;

FIG. 8 illustrates an internal configuration of a driver circuit;

FIGS. 9A-9E illustrate an internal configuration and operation of a drive controller;

FIGS. 10A-10C illustrate correspondence relationships of sensor output waveform and drive signal waveform;

FIG. 16 illustrates another configuration of a driver circuit;

DESCRIPTION OF THE PREFERRED EMBODIMENT

Embodiments of the present invention will be described in the following order.

A. Overview of Motor Configuration and Operation of Embodiment 1
B. Configuration of Drive Circuit Unit
C. Modification Example of Motor Configuration of Embodiment 1
D. Overview of Motor Configuration and Operation of Embodiment 2
E. Modification Examples

A. Overview of Motor Configuration and Operation of Embodiment 1

Figure 1A:
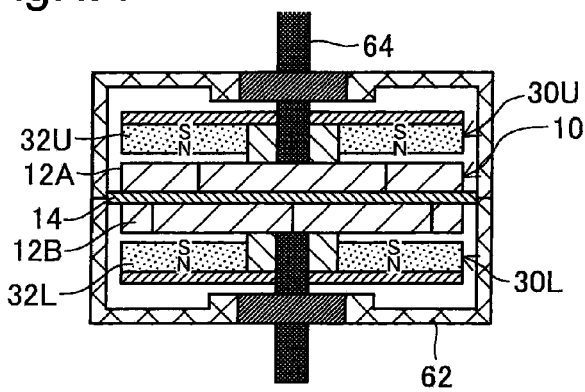
FIGS. 1A-1D are sectional views depicting a configuration of the motor unit of an electric motor pertaining to Embodiment 1.
Figure 1B:
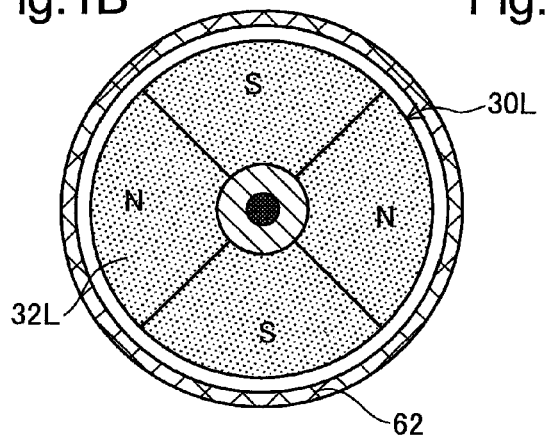

FIGS. 1A-1D depict in sectional view the configuration of the motor unit of a brushless motor pertaining to a first embodiment of the present invention. This motor unit has a stator portion 10, an upper rotor portion 30U, and a lower rotor portion 30L. Each of these components 10, 30U, 30L has generally disk-shaped contours. FIG. 1B is a horizontal sectional view of the lower rotor portion 30L. The lower rotor portion 30L has four permanent magnets 32L each having generally fan-shaped contours. The upper rotor portion 30U is identical in design to the lower rotor portion 30L and has been omitted from the illustration. The upper rotor portion 30U and the lower rotor portion 30L are fastened to a center shaft 64 and rotate simultaneously. The direction of magnetization of the magnets 32U, 32L is parallel to the rotating shaft 64.

Figure 1C:
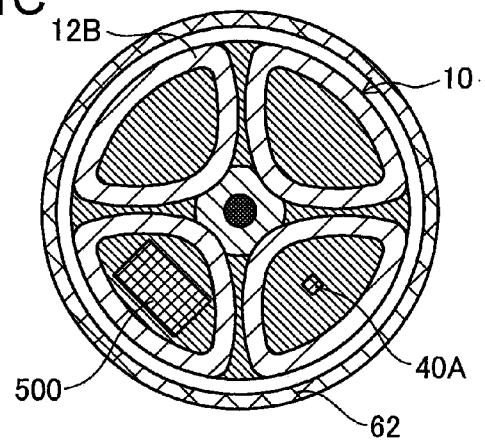

FIG. 1C is a horizontal sectional view of the stator portion 10. As shown in FIG. 1A, the stator portion 10 has a plurality of phase A coils 12A, a plurality of phase B coils 12B, and a support member 14 supporting these coils 12A, 12B. FIG. 1C depicts the phase B coils 12B. In this example, there are provided four phase B coils 12B each of which is wound in a fan-shaped configuration. The phase A coils 12A have this same design. A drive circuit unit 500 is installed in the stator portion 10 as well. As shown in FIG. 1A, the stator portion 10 is fixed in a casing 62.

Figure 1D:
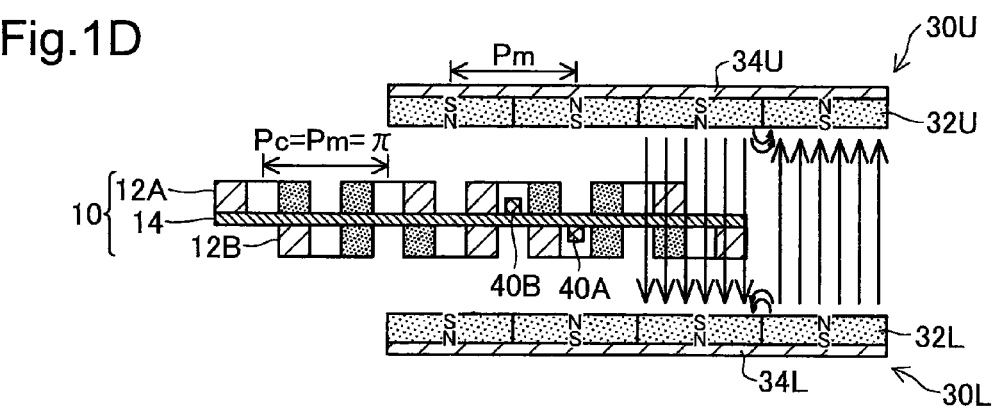

FIG. 1D is a conceptual diagram depicting the relationship of the stator portion 10 and the two rotor portions 30U, 30L. On the support member 14 of the stator portion 10 are provided a magnetic sensor 40A for phase A use and a magnetic sensor 40B for phase B use. The magnetic sensors 40A, 40B are used to detect the position of the rotor portions 30U, 30L (i.e. the phase of the motor). These sensors will hereinafter be referred to as the "phase A sensor" and the "phase B sensor." The phase A sensor 40A is positioned at a center location between two of the phase A coils 12A. Similarly, the phase B sensor 40B is positioned at a center location between two of the phase B coils 12B. In this example, the phase A sensor 40A is positioned together with the phase B coils 12B at the lower face of the support member 14, but it could instead be positioned at the upper face of the support member 14. This applies to the phase B sensor 40B as well. As will be understood from FIG. 1C, in this embodiment, the phase A sensor 40A is positioned inside one of the phase B coils 12B, which has the advantage of ensuring space for placement of the sensor 40A.

As shown in FIG. 1D, the magnets 32U, 32L are each positioned at a constant magnetic pole pitch Pm, with adjacent magnets being magnetized in opposite directions. The phase A coils 12A are arranged at constant pitch Pc, with adjacent coils being excited in opposite directions. This applies to the phase B coils 12B as well. In the present embodiment, the magnetic pole pitch Pm is equal to the coil pitch Pc, and in terms of electrical angle is equivalent to $\pi$. An electrical angle of $2\pi$ is associated with the mechanical angle or distance of displacement when the phase of the drive signal changes by $2\pi$. In the present embodiment, when the phase of the drive signal changes by $2\pi$, the rotor portions 30U, 30D undergo displacement by the equivalent of twice the magnetic pole pitch Pm. The phase A coils 12A and the phase B coils 12B are positioned at locations phase-shifted by $\pi/2$ from each other.

Figure 26:
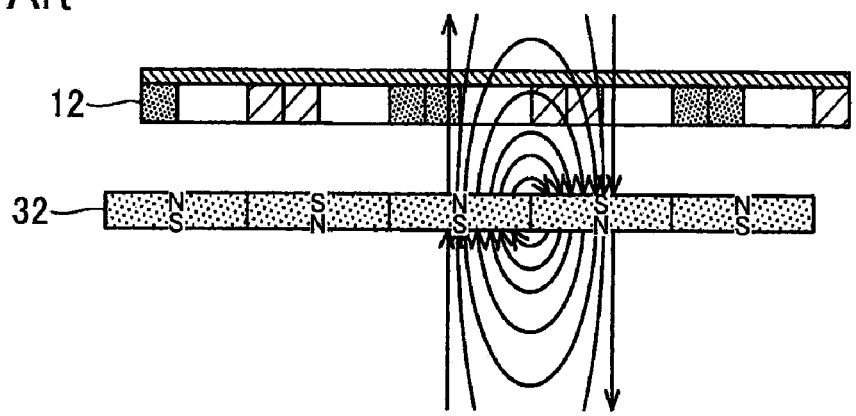
FIG. 26 shows an exemplary configuration of a conventional brushless motor.

The magnets 32U of the upper rotor portion 30U and the magnets 32L of the lower rotor portion 30L are positioned with their magnetic poles which face towards the stator portion 10 having mutually different polarity (N pole and S pole). In other words, the magnets 32U of the upper rotor portion 30U and the magnets 32L of the lower rotor portion 30L are positioned with their opposite poles facing one another. As a result, as shown at the right end in FIG. 1D, the magnetic field between these magnets 32U, 32L will be represented by substantially straight magnetic field lines and will be closed between these magnets 32U, 32L. It will be appreciated that this closed magnetic field is stronger than the open magnetic field shown in FIG. 26 discussed previously. As a result, magnetic field utilization efficiency will be higher, and it will be possible to improve motor efficiency. In preferred practice, magnetic yokes 34U, 34L made of a ferromagnetic body will be disposed respectively on the outside faces of the magnets 32U, 32L. The magnetic yokes 34U, 34L make it possible to further strengthen the magnetic field in the coils. However, the magnetic yokes 34U, 34L may be omitted.

Figure 2A:
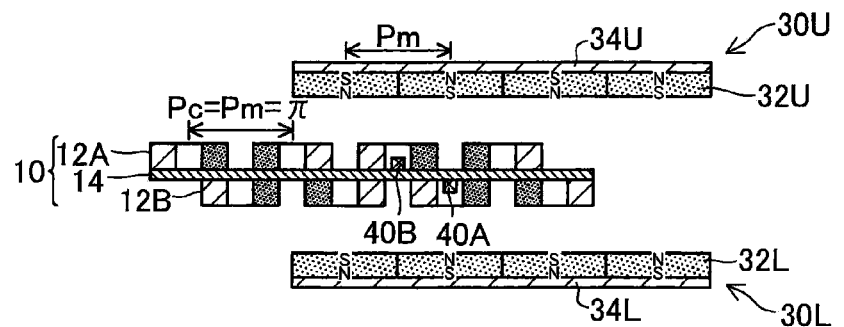
FIGS. 2A-2D illustrate the relationship of magnetic sensor output to back electromotive force waveform of a coil.
Figure 2B:
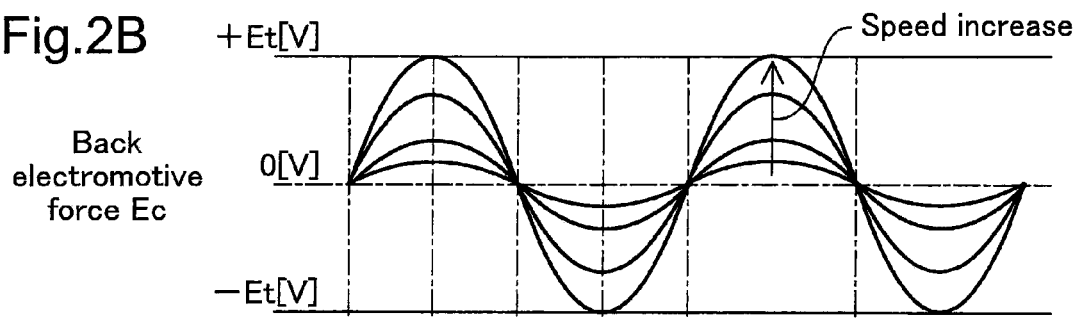
Figure 2C:
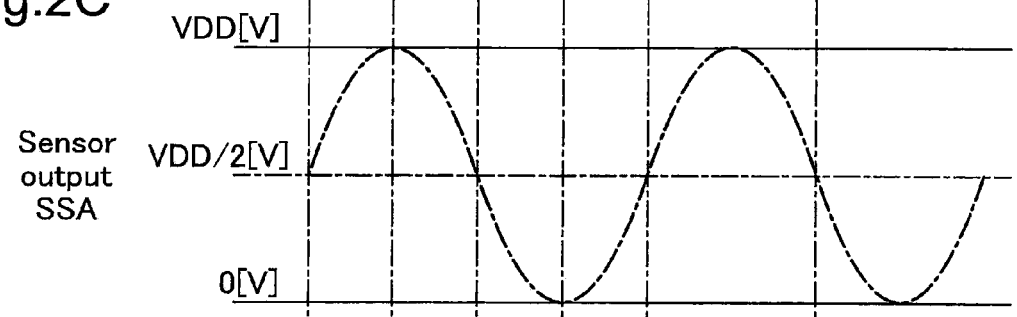
Figure 2D:
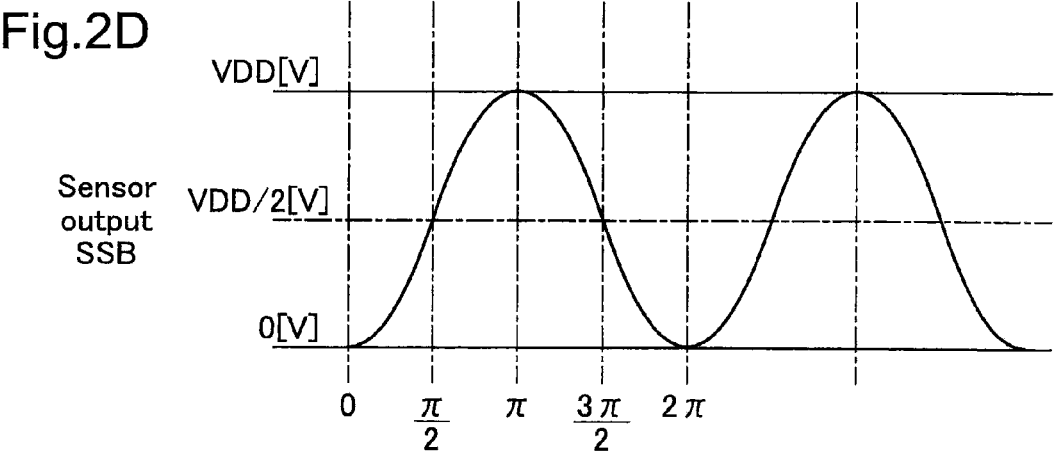

FIGS. 2A-2D illustrate the relationship of sensor output and back electromotive force waveform. FIG. 2A is identical to FIG. 1D. FIG. 2B shows an exemplary waveform of back electromotive force generated by the phase A coils 12A. FIGS. 2C and 2D show exemplary waveforms of sensor outputs SSA, SSB of the phase A sensor 40A and the phase B sensor 40B. These sensors 40A, 40B can generate sensor outputs SSA, SSB of shape substantially similar to the back electromotive force of the coils during motor operation. The back electromotive force of the coils 12A shown in FIG. 2B tends to rise together with motor speed but its waveform shape (sine wave) maintains substantially similar shape. Hall ICs that utilize the Hall effect, for example, could be employed as the sensors 40A, 40B. In this example, the sensor output SSA and the back electromotive force Ec are each a sine wave or waveform approximating a sine wave. As will be discussed later, the drive control circuit of this motor, utilizing the sensor outputs SSA, SSB, applies voltage of shape substantially similar to the back electromotive force Ec to the respective coils 12A, 12B.

An electric motor functions as an energy conversion device that converts between mechanical energy and electrical energy. The back electromagnetic force of the coils represents mechanical energy of the electric motor converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "voltage of similar waveform to the back electromagnetic force" means voltage that generates current flowing in the opposite direction from the back electromagnetic force.

Figure 3A:
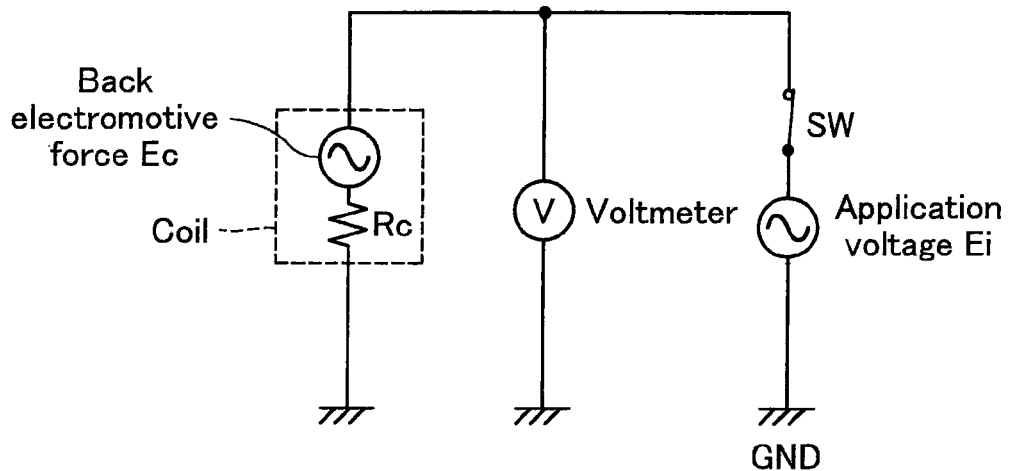
FIGS. 3A and 3B are diagrams illustrating the relationship of applied voltage and electromotive force of a coil.

FIG. 3A is a model diagram illustrating the relationship of applied voltage and electromotive force of a coil. Here, the coil is simulated in terms of AC back electromotive force Ec and resistance Rc. In this circuit, a voltmeter V is parallel-connected to the AC application voltage Ei and the coil. The back electromotive force Ec is also termed "induced voltage Ec" and the application voltage Ei is also termed "exciting voltage Ei." When AC voltage Ei is applied to the coil to drive the motor, back electromotive force Ec will be generated a direction of current flow opposite that of the application voltage Ei. When a switch SW is opened while the motor is rotating, the back electromotive force Ec can be measured with the voltmeter V. The polarity of the back electromotive force Ec measured with the switch SW open will be the same as the polarity of the application voltage Ei measured with the switch SW closed. The phrase "application of voltage of substantially similar waveform to the back electromagnetic force" herein refers to application of voltage having the same polarity as, and waveform of substantially similar shape to, the back electromotive force Ec measured by the voltmeter V.

Figure 3B:
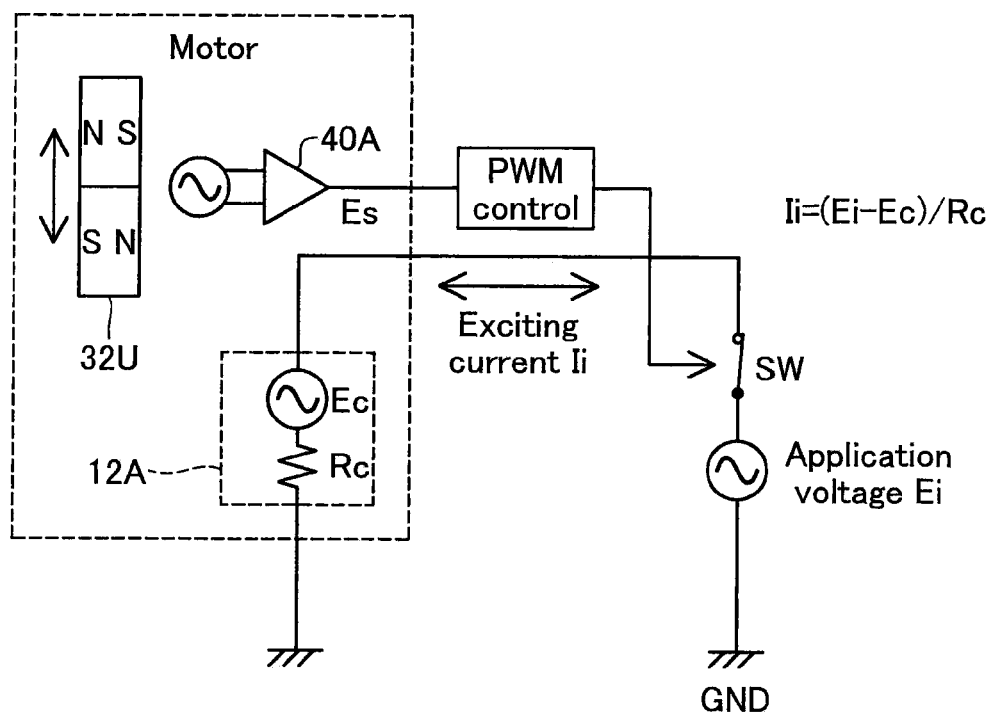
Figure 5A:
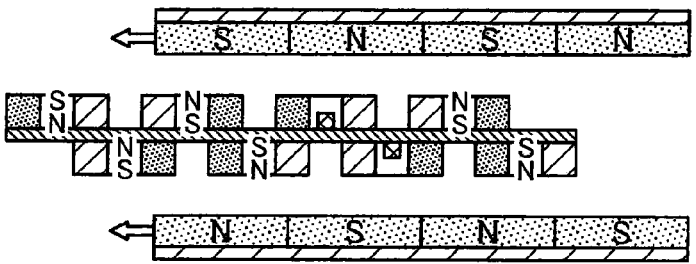
FIGS. 5A-5D illustrate reverse rotation operation of the brushless motor of Embodiment 1.
Figure 5B:
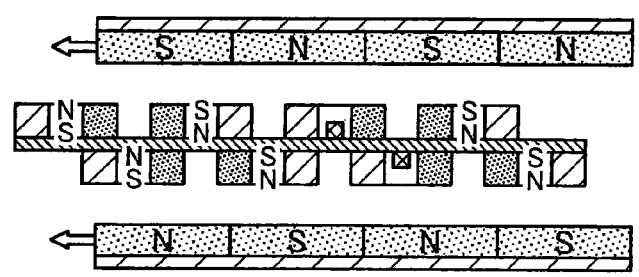
Figure 5C:
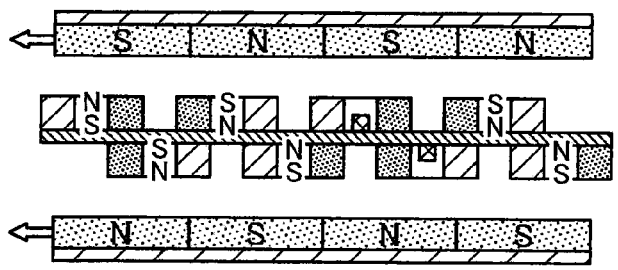
Figure 5D:
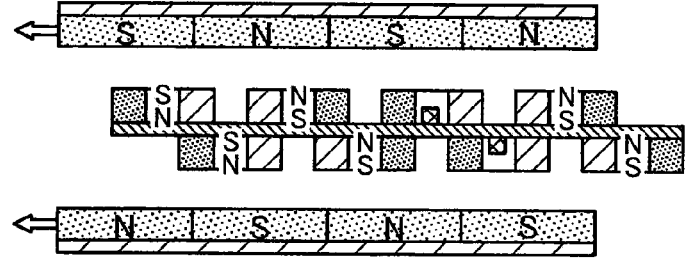

FIG. 3B illustrates an overview of the driving method employed in the present embodiment. Here, the motor is simulated by the phase A coils 12A, the permanent magnets 32U, and the phase A sensor 40A. When the rotor having the permanent magnets 32U turns, AC voltage Es (also termed "sensor voltage Es") is generated in the sensor 40A. This sensor voltage Es has a waveform shape substantially similar to that of the induced voltage Ec of the coil 12A. Thus, by generating PWM signal which simulates the sensor voltage Es for on/off control of the switch SW it will be possible to apply to the coils 12A exciting voltage Ei of substantially similar waveform to the induced voltage Ec. The exciting current Ii at this time will be given by Ii=(Ei−Ec)/Rc.

As noted previously, when driving a motor, it is possible to drive the motor with maximum efficiency through application of voltage of waveform similar to that of the back electromagnetic force. It can be appreciated that energy conversion efficiency will be relatively low in proximity to the midpoint (in proximity to 0 voltage) of the sine wave waveform of back electromotive force, while conversely energy conversion efficiency will be relatively high in proximity to the peak of the back electromotive force waveform. Where a motor is driven by applying voltage of waveform similar to that of the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 (midpoint) so motor efficiency will drop. Also, when voltage is applied during such periods of low energy conversion efficiency, due to eddy current vibration will be produced in directions other than the direction of rotation, thereby creating a noise problem.

As will be understood from the preceding discussion, the advantages of driving a motor through application of voltage of similar waveform to the back electromotive force are improved motor efficiency and reduced vibration and noise.

FIG. 4A-4D are illustrations depicting forward rotation operation of the brushless motor of the embodiment. FIG. 4A depicts the state just before the phase reaches 0. The letters "N" and "S" shown at locations of the phase A coils 12A and the phase B coils 12B indicate the excitation direction of these coils 12A, 12B. When the coils 12A, 12B are excited, forces of attraction and repulsion are generated between the coils 12A, 12B and the magnets 32U, 32L. As a result, the rotor portions 30U, 30L turn in the forward rotation direction (rightward in the drawing). At the timing of the phase going to 0, the excitation direction of the phase A coils 12A reverses (see FIGS. 2A-2D). FIG. 4B depicts a state where the phase has advanced to just before π/2. At the timing of the phase going to π/2, the excitation direction of the phase B coils 12B reverses. FIG. 4C depicts a state where the phase has advanced to just before π. At the timing of the phase going to π, the excitation direction of the phase A coils 12B again reverses. FIG. 4D depicts a state where the phase has advanced to just before 3π/2. At the timing of the phase going to 3π/2, the excitation direction of the phase B coils 12B again reverses.

As will be apparent from FIGS. 2C and 2D as well, at times at which the phase equals an integral multiple of π/2 the sensor outputs SSA, SSB will go to zero, and thus driving force will be generated from only one of the two sets of coils 12A, 12B. However, during all periods except for times at which the phase equals integral multiples of π/2, it will be possible for the sets of coils 12A, 12B of both phases to generate driving force. Consequently, high torque can be generated using the sets of coils 12A, 12B of both phases.

As will be apparent from FIG. 4A, the phase A sensor 40A is positioned such that the location at which the polarity of its sensor output switches will be situated at a location where the center of a phase A coil 12A faces the center of a permanent magnet 32U. Similarly, the phase B sensor 40B is positioned such that the location at which the polarity of the sensor output switches will be situated at a location where the center of a phase B coil 12A faces the center of a permanent magnet 32L. By positioning the sensors 40A, 40B at these locations, it will be possible to generate from the sensors 40A, 40B the sensor outputs SSA, SSB (FIGS. 2C and 2D) which have substantially similar waveform to the back electromotive force of the coils.

FIG. 5A-5D are illustrations depicting reverse rotation operation of the brushless motor of the embodiment. FIG. 5A-5D respectively depicts states where the phase has reached just before 0, π/2, it, and 3π/2. Reverse rotation operation can be accomplished, for example, by reversing the polarity of the drive voltages of the coils 12A, 12B to from that of the respective drive voltages during forward rotation operation.

FIG. 6 illustrates the relationship between the preferred materials and applications of the electric machine as an embodiment of the present invention. In various applications, the following items may be considered as most important.

(1) Low cost.
(2) Small size.
(3) Low power consumption.
(4) Endurance against vibrations and shocks.
(5) Suitability for high-temperature environment.
(6) Light weight.
(7) Ability to generate a large torque.
(8) Capability of high-speed rotation.
(9) Environmental friendliness.

The right column of applications in FIG. 6 shows the materials suitable for the permanent magnet, rotor material (support member of the rotor portion 30U, 30L), bobbin material (core material of the coils), and case material. The "high-cost magnet", as referred to in the figure, means a neodymium magnet, samarium-cobalt magnet, and alnico magnet. The "typical resin" means various resins (in particular, synthetic resins), excluding carbon-type resins and vegetable resins.

The "carbon-type resin" means glassy carbon, carbon fiber reinforced resin (CFRP), and carbon fibers. Aluminum, stainless steel, titanium, magnesium, copper, silver, gold, and alloys thereof can be used as the metal for the rotor material. Fine ceramics, steatite ceramics, alumina, zircon, and glass can be used as the "ceramics". Materials (usually, vegetable resins) such as plants, wood materials, and clay can be used as the "natural materials".

As can be easily understood from those examples, in the electric machine of the present embodiment of the present invention, various nonmagnetic nonconductive materials can be used as the rotor materials, bobbin materials (core materials) and case materials. However, in certain cases, in order to increase strength, metal materials such as aluminum and alloys thereof are used as the rotor materials. In this case, too, it is preferred that the bobbin and casing be formed from substantially nonmagnetic nonconductive materials. Here, the expression "substantially nonmagnetic nonconductive materials" means that very small portions are allowed to be magnetic or conductive. For example, whether the bobbin has been formed from a substantially nonmagnetic nonconductive material can be determined by the presence or absence of cogging in the motor. Further, whether the case has been formed from a substantially nonmagnetic nonconductive material can be determined by whether the iron loss (eddy current loss) caused by the case material is below the prescribed value (for example, 1% of the input).

Among the structural components of the electric machine, there are some components that are preferably fabricated from metal materials, the rotary shaft and bearings being the examples of such components. The term "structural components" as used herein means components used to support the shape of the electric machine and means main components that do not include small parts or fixing elements. The rotor and casing are the typical structural components. In the electric machine in accordance with the present invention, main structural components other than the rotary shaft and bearings are preferably formed from nonmagnetic nonconductive materials.

B. Configuration of Drive Circuit Unit

Figure 7:
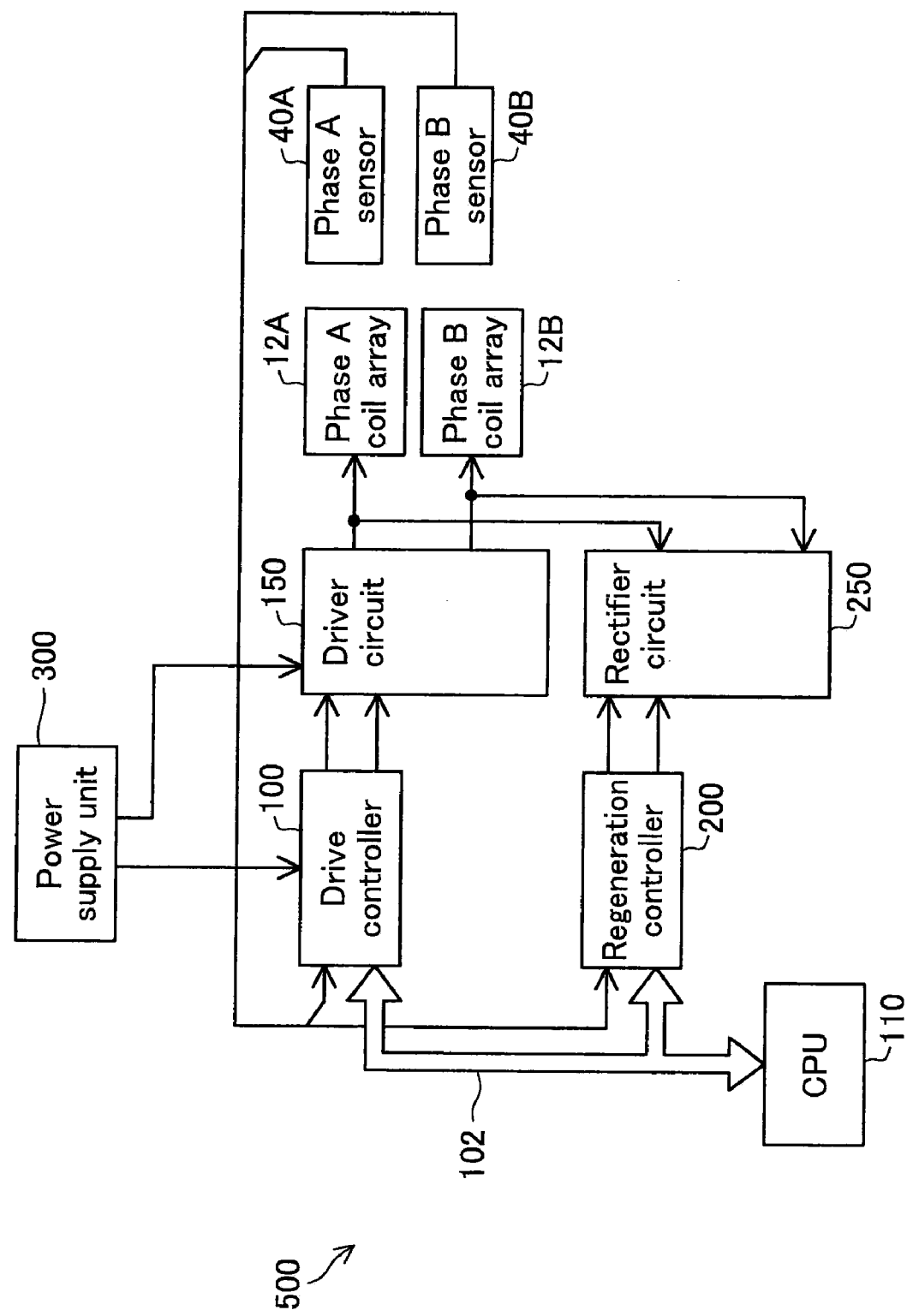
FIG. 7 is a block diagram depicting a configuration of a motor drive circuit unit.

FIG. 7 is a block diagram depicting an internal configuration of a drive circuit unit in the present embodiment. The drive circuit unit 500 has a CPU 110, a drive controller 100, a regeneration controller 200, a driver circuit 150, a rectifier circuit 250, and a power supply unit 300. The two controllers 100, 200 are connected to the CPU 110 via a bus 102. The drive controller 100 and the driver circuit 150 are circuits for carrying out control in instances where driving force is to be generated in the electric motor. The regeneration controller 200 and the rectifier circuit 250 are circuits for carrying out control in instances where power from the electric motor is to be regenerated. The regeneration controller 200 and the rectifier circuit 250 will be referred to collectively as a "regeneration circuit." The drive controller 100 will also be referred to as a "drive signal generating circuit." The power supply unit 300 is a circuit for supplying various power supply voltages to other circuits in the drive circuit unit 500. In FIG. 7, for convenience, only the power lines going from the power supply unit 300 to the drive controller 100 and the driver circuit 150 are shown; power lines leading to other circuits have been omitted.

FIG. 8 shows a configuration of a phase A driver circuit 120A and a phase B driver circuit 120B included in the driver circuit 150 (FIG. 7). The phase A driver circuit 120A is an H bridge circuit for delivering AC drive signals DRVA1, DRVA2 to the phase A coils 12A. The white circles next to terminal portions of blocks which indicate drive signals denote negative logic and indicate that the signal is inverted. The arrows labeled IA1, IA2 respectively indicate the direction of current flow with the A1 drive signal DRVA1 and the A2 drive signal DRVA2. The configuration of the phase B driver circuit 120B is the same as the configuration of the phase A driver circuit 120A.

FIGS. 9A-9E illustrate internal configuration and operation of the drive controller 100 (FIG. 7). The drive controller 100 has a basic clock generating circuit 510, a 1/N frequency divider 520, a PWM unit 530, a moving direction register 540, a multiplier 550, an encoder unit 560, an AD converter 570, a voltage control value register 580, and an excitation interval setting unit 590. Although the drive controller 100 generates both phase A drive signals and phase B drive signal, FIG. 9A only depicts circuitry for phase A, for convenience of illustration. The same circuitry for phase B is also included in the drive controller 100.

The basic clock generating circuit 510 generates a clock signal PCL of prescribed frequency, and includes a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 110. The PWM unit 530 generates the AC single-phase drive signals DRVA1, DRVA2 (FIG. 8) based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setting unit 590. This operation will be discussed later.

A value RI indicating the direction for motor rotation is established in the moving direction register 540, by the CPU 110. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the π phase point of the output waveform, or the point at which the sine wave passes through the origin. The AD converter 570 performs AD conversion of this sensor output SSA to generate a digital value of sensor output. The output of the AD converter 570 has a range, for example, of FFh to 0 h (the "h" suffix denotes hexadecimal), with the median value of 80 h corresponding to the middle point of the sensor waveform.

The encoder unit 560 converts the range of the sensor output value subsequent to the AD conversion, and sets the value of the middle point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The voltage control value register 580 stores a voltage control value Ya established by the CPU 110. This voltage control value Ya, together with the excitation interval signal Ea discussed later, functions as a value for setting the application voltage to the motor. The value Ya can assume a value between 0 and 1.0, for example. Assuming an instance where the excitation interval signal Ea has been set with no non-excitation intervals provided so that all of the intervals are excitation intervals, Ya=0 will mean that the application voltage is zero, and Ya=1.0 will mean that the application voltage is at maximum value. The multiplier 550 performs multiplication of the voltage control value Ya and the sensor output value Xa output from the encoder unit 560 and conversion to an integer; the multiplication value Ma thereof is supplied to the PWM unit 530.

FIGS. 9B-9E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 9B-9E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is negative; in FIGS. 9B-9E, both are shown together. For convenience, the second drive signal DRVA2 is shown in the form of pulses on the negative side.

FIGS. 10A-10C depict correspondence between sensor output waveform and waveform of the drive signals generated by the PWM unit 530. In the drawing, "Hiz" denotes a state of high impedance where the magnetic coils are not excited. As described in FIGS. 9B-9E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA.

The PWM unit 530 is constructed such that drive signals are output only during the excitation intervals indicated by the excitation interval signal Ea supplied by the excitation interval setting unit 590, with no drive signals being output at intervals except for the excitation intervals (non-excitation intervals). FIG. 10C depicts drive signal waveforms produced in the case where excitation intervals EP and non-excitation intervals NEP have been established by the excitation interval signal Ea. During the excitation intervals EP, the drive signal pulses of FIG. 10B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the peak point of the back electromotive force waveform; and preferably the non-excitation intervals NEP will be established in intervals symmetric about the middle point (center) of the back electromotive force waveform.

As discussed previously, if the voltage control value Ya is set to a value less than 1, the multiplication value Ma will be decreased in proportion to the voltage control value Ya. Consequently, effective adjustment of application voltage is possible by the voltage control value Ya as well.

As will be understood from the preceding description, with the motor of the present embodiment, it is possible to adjust the application voltage using both the voltage control value Ya and the excitation interval signal Ea. In preferred practice, relationships between desired application voltage on the one hand, and the voltage control value Ya and excitation interval signal Ea on the other, will be stored in advance in table format in memory in the drive circuit unit 500 (FIG. 7). By so doing, when the drive circuit unit 500 has received a target value for the desired application voltage from the outside, it will be possible for the CPU 110, in response to the target value, to set the voltage control value Ya and the excitation interval signal Ea in the drive controller 100. Adjustment of application voltage does not require the use of both the voltage control value Ya and the excitation interval signal Ea, and it would be acceptable to use either one of them instead.

Figure 11:
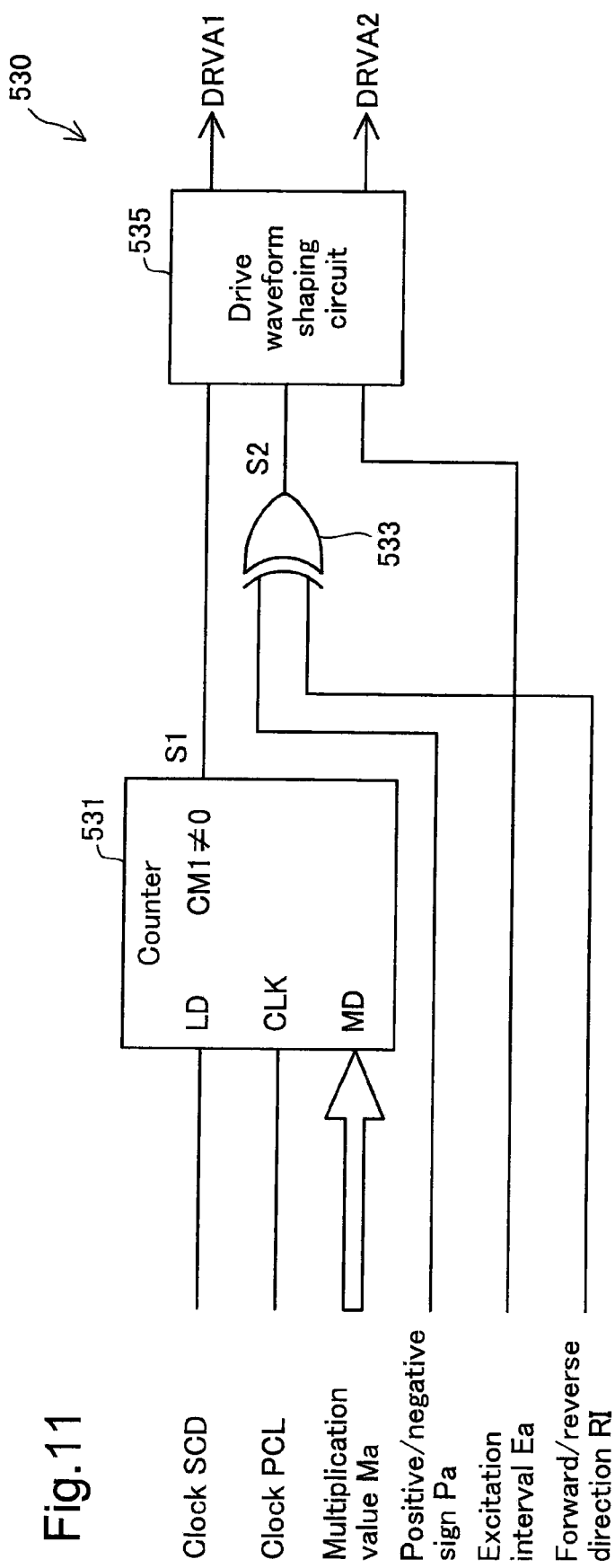
FIG. 11 is a block diagram depicting an internal configuration of a PWM unit.

FIG. 11 is a block diagram depicting the internal configuration of the PWM unit 530 (FIG. 9A). The PWM unit 530 has a counter 531, an EXOR circuit 533, and a drive waveform shaping circuit 535. Their operation will be described below.

Figure 12:
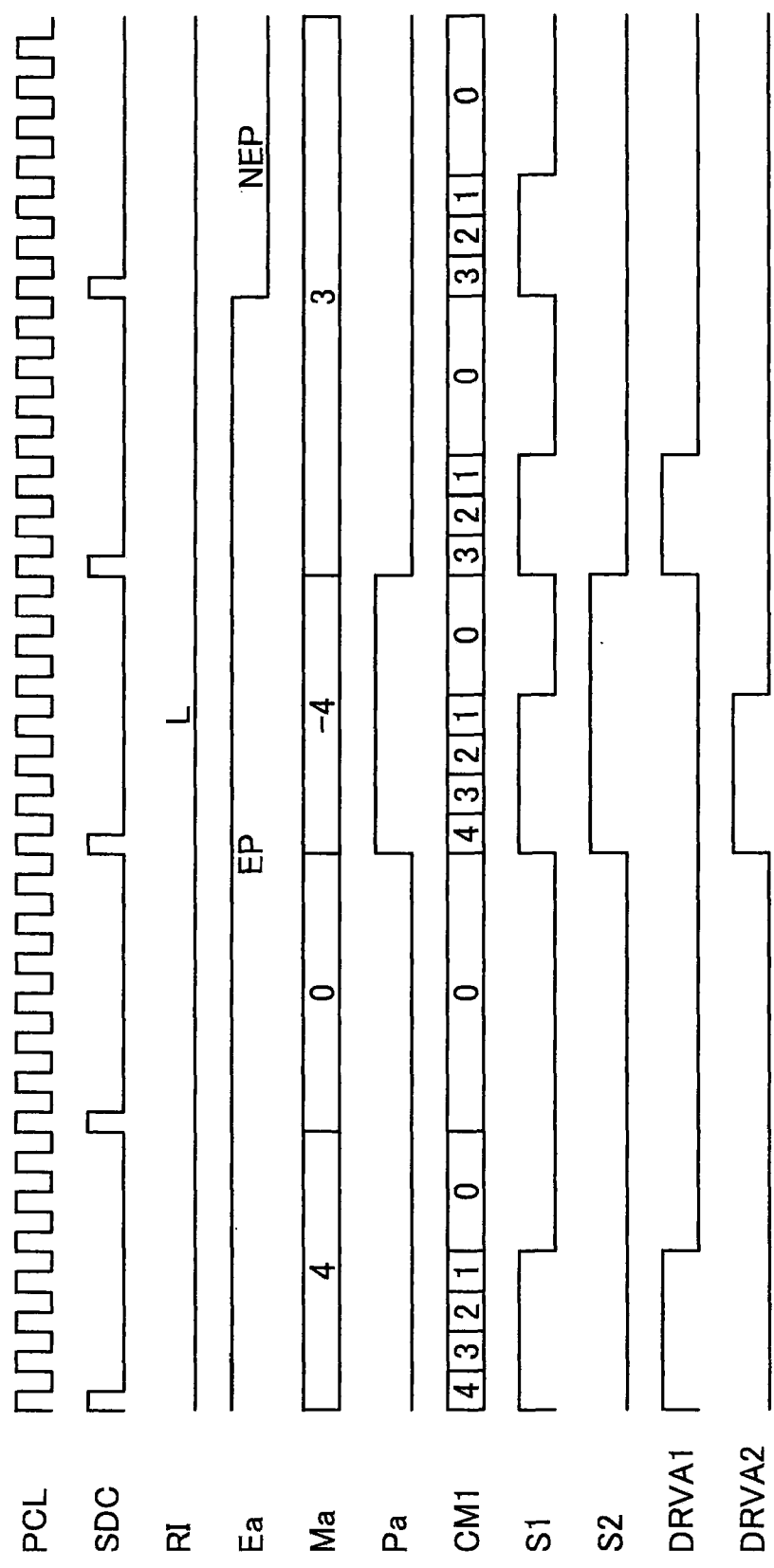
FIG. 12 is a timing chart depicting operation of the PWM unit during forward rotation of the motor.

FIG. 12 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output S1 of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 12, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 12, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

Figure 13:
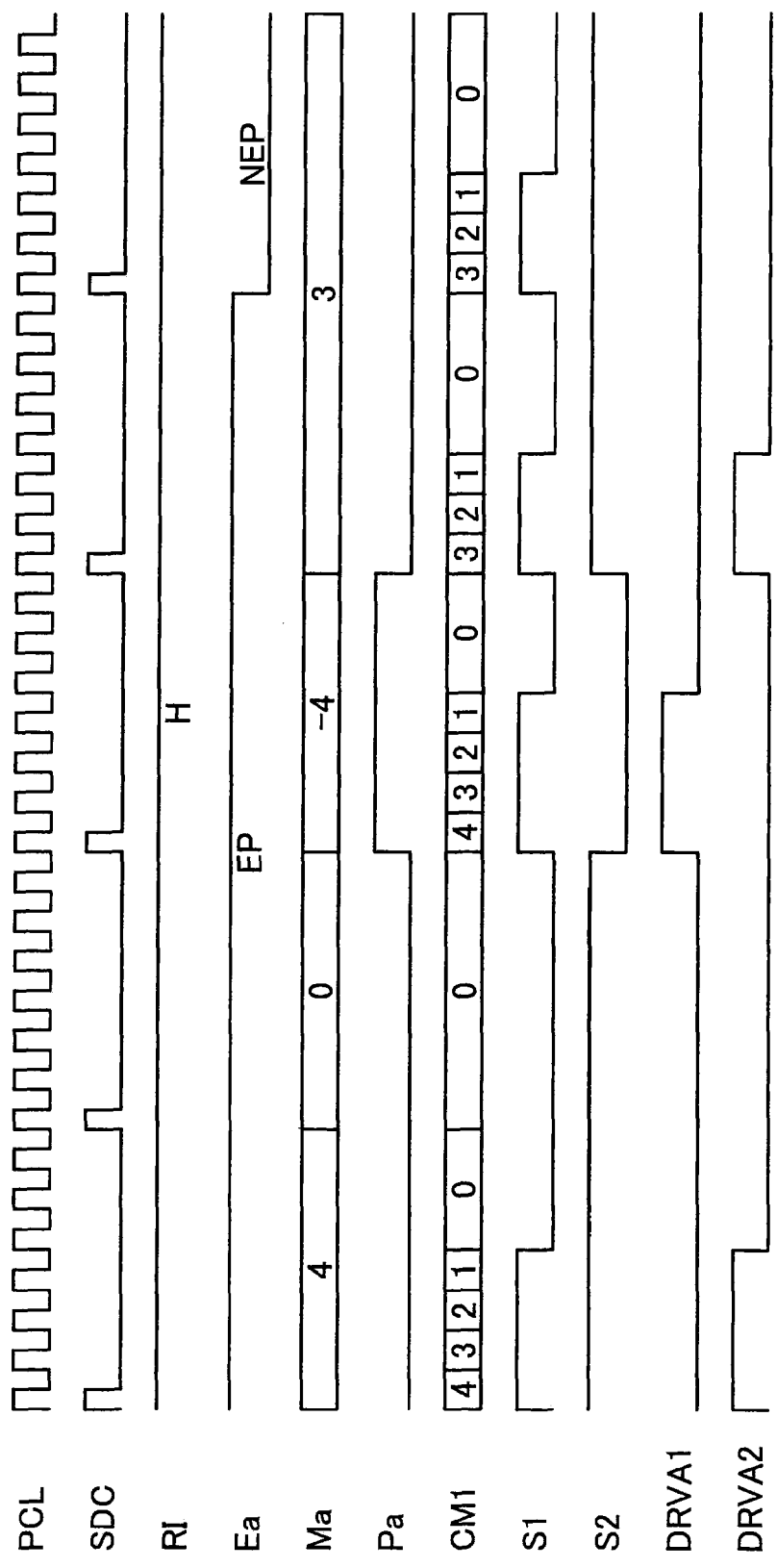
FIG. 13 is a timing chart depicting operation of the PWM unit during reverse rotation of the motor.

FIG. 13 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 12, and it will be appreciated that the motor runs in reverse as a result.

Figure 14A:
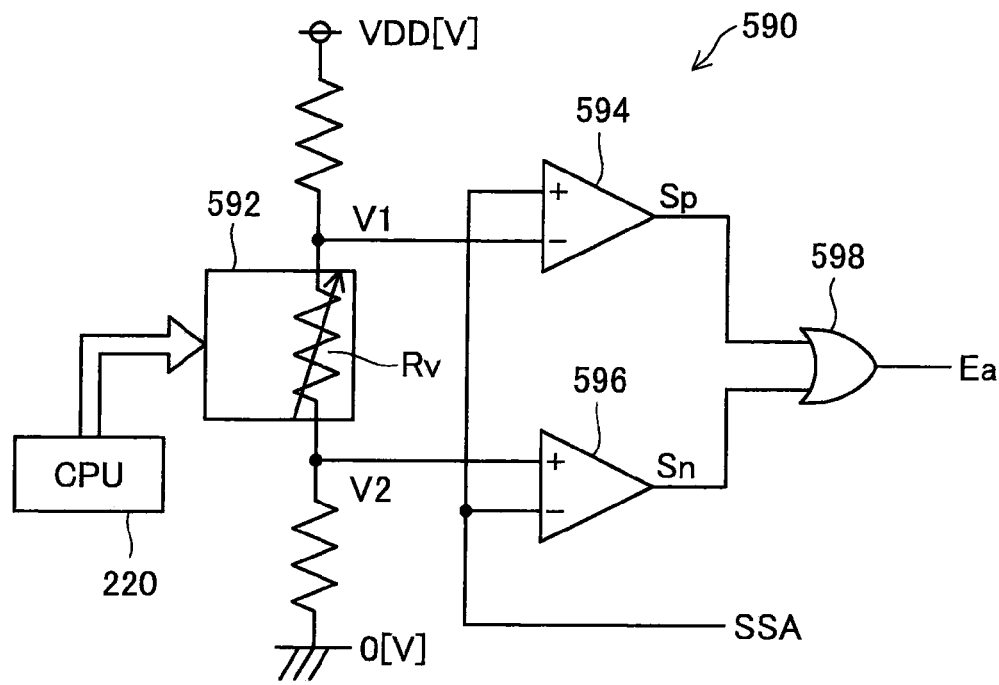
FIGS. 14A and 14B illustrate internal configuration and operation of an excitation interval setting unit.
Figure 14B:
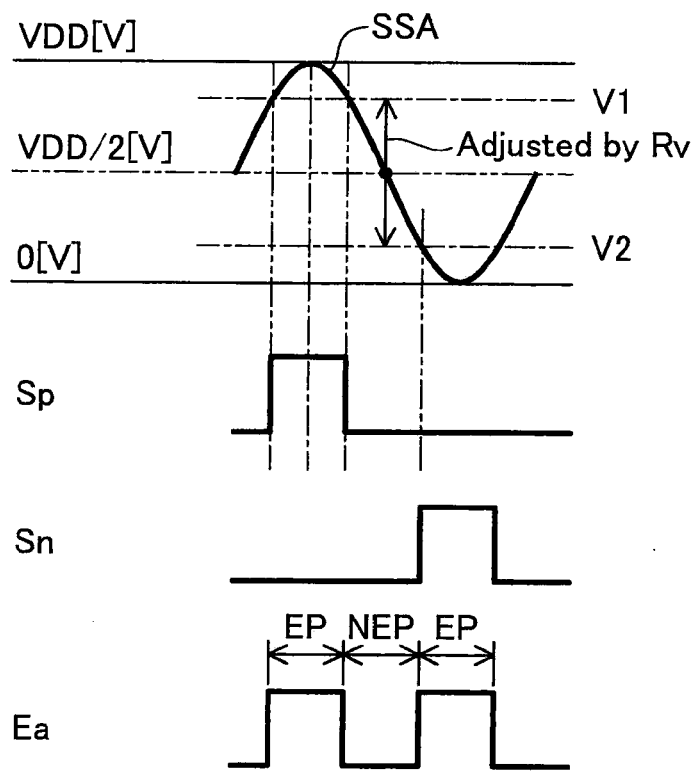

FIGS. 14A and 14B illustrate the internal configuration and operation of an excitation interval setting unit 590. The excitation interval setting unit 590 has an electronic variable resistor 592, a voltage comparators 594, 596, and an OR circuit 598. The resistance Rv of the electronic variable resistor 592 is set by the CPU 110. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 14B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 14B, the excitation interval signal Ea can be used as a signal indicating excitation intervals EP and non-excitation intervals NEP. The excitation intervals EP and non-excitation intervals NEP are established by the CPU 110, by adjusting the variable resistance Rv.

Figure 15A:
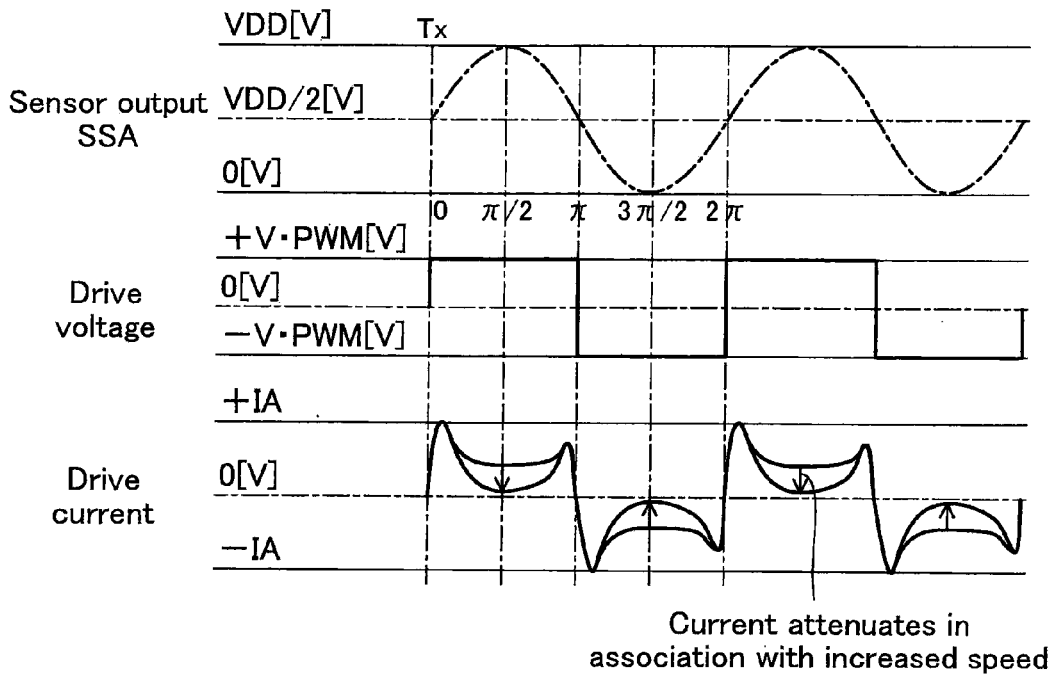
FIGS. 15A and 15B illustrate comparison of various signal waveforms for the motor of Embodiment 1.
Figure 15B:
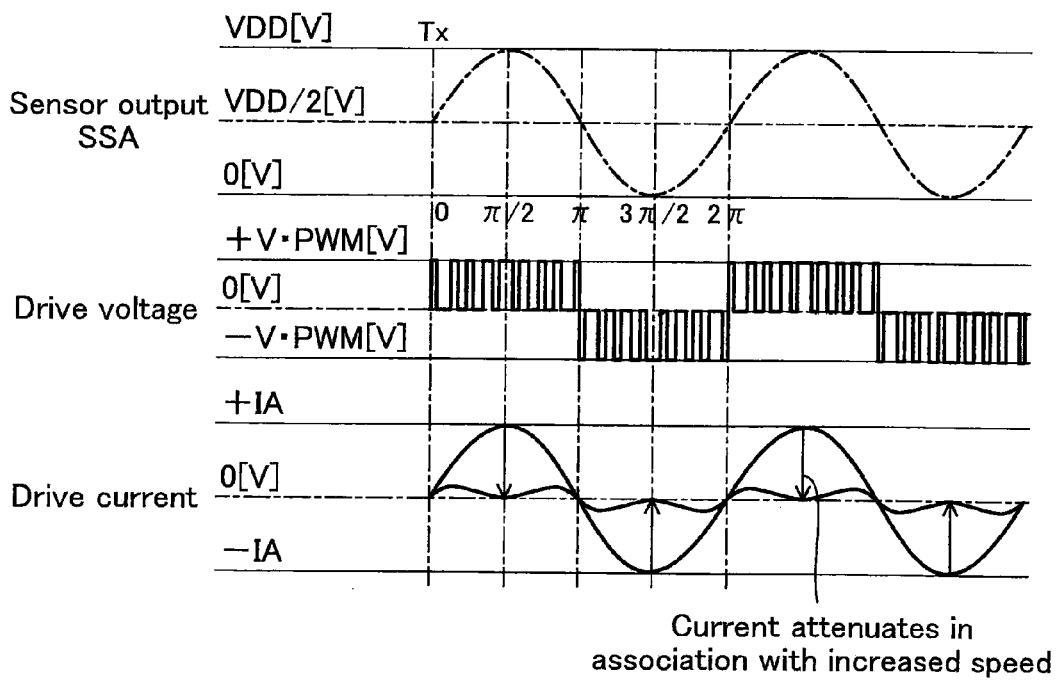

FIGS. 15A and 15B are illustrations comparing various signal waveforms in the case where the motor of the embodiment discussed above is driven by a rectangular wave, and where driven by a sine wave. Where a rectangular wave is employed for driving, a drive voltage of rectangular wave shape is applied to the coils. While the drive current is close to a rectangular wave at startup, it decreases as rotation speed increases. This is because the back electromotive force increases in response to the increased rotation speed (FIG. 2B). With a rectangular wave, however, despite increased rotation speed the current value will not decline appreciably in proximity to the timing of switching of the drive voltage at phase=nπ, so a fairly large current will tend to flow.

On the other hand, where a sine wave is employed for driving, PWM control is employed for the drive voltage so that the effective values of the drive voltage have sine wave shape. While the drive current is close to a sine wave at startup, as rotation speed increases the drive current will decrease due to the effects of back electromotive force. With sine wave driving, the current value declines appreciably in proximity to the timing of switching of the drive voltage polarity at phase=nπ. As discussed in the context of FIGS. 2A-2C, generally speaking the energy conversion efficiency of a motor is low in proximity to the timing of switching of the drive voltage polarity. With sine wave driving, the current value during intervals of low efficiency is lower than with rectangular wave, making it possible to drive the motor more efficiently.

FIG. 16 depicts another configuration example of the phase A driver circuit 120A and the phase B driver circuit 120B included in the driver circuit 150 (FIG. 7). These driver circuits 120A, 120B are furnished with amplifier circuits 122 situated in front of the gate electrodes of the transistors which make up the driver circuits 120A, 120B shown in FIG. 8. While the type of transistor also differs from that in FIG. 8, transistors of any type can be used as the transistors. In order to be able to drive the motor of the present invention over a wider operating range with regard to torque and speed, it will be preferable to establish variable power supply voltage VDD of the driver circuits 120A, 120B. Where the power supply voltage VDD has been changed, the level of the drive signals DRVA1, DRVA2, DRVB1, DRVB2 applied to the gate voltages of the transistors will change proportionally therewith. By so doing the motor can be driven using a wider power supply voltage VDD range. The amplifier circuits 122 are circuits for changing the level of the drive signals DRVA1, DRVA2, DRVB1, DRVB2. In preferred practice the power supply unit 300 of the drive circuit unit 500 shown in FIG. 7 will supply variable power supply voltage VDD to the driver circuit 150.

Figure 17:
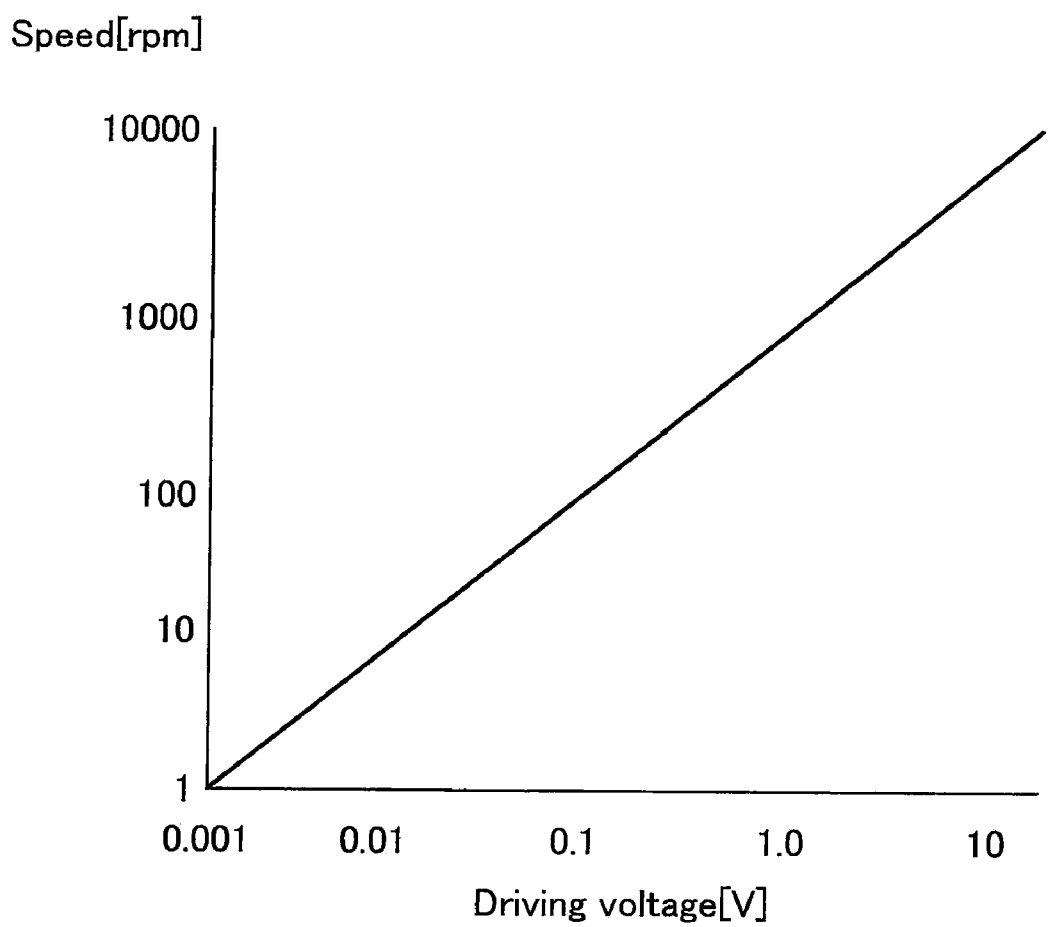
FIG. 17 is a graph showing speed of the motor of the embodiment in the absence of load.

FIG. 17 shows the speed of the motor of the embodiment in the absence of load. As will be apparent from the graph, in the absence of load the motor of the embodiment will rotate at stable speed down to very low speed. The reason is that since there is no magnetic core, cogging does not occur.

Figure 18:
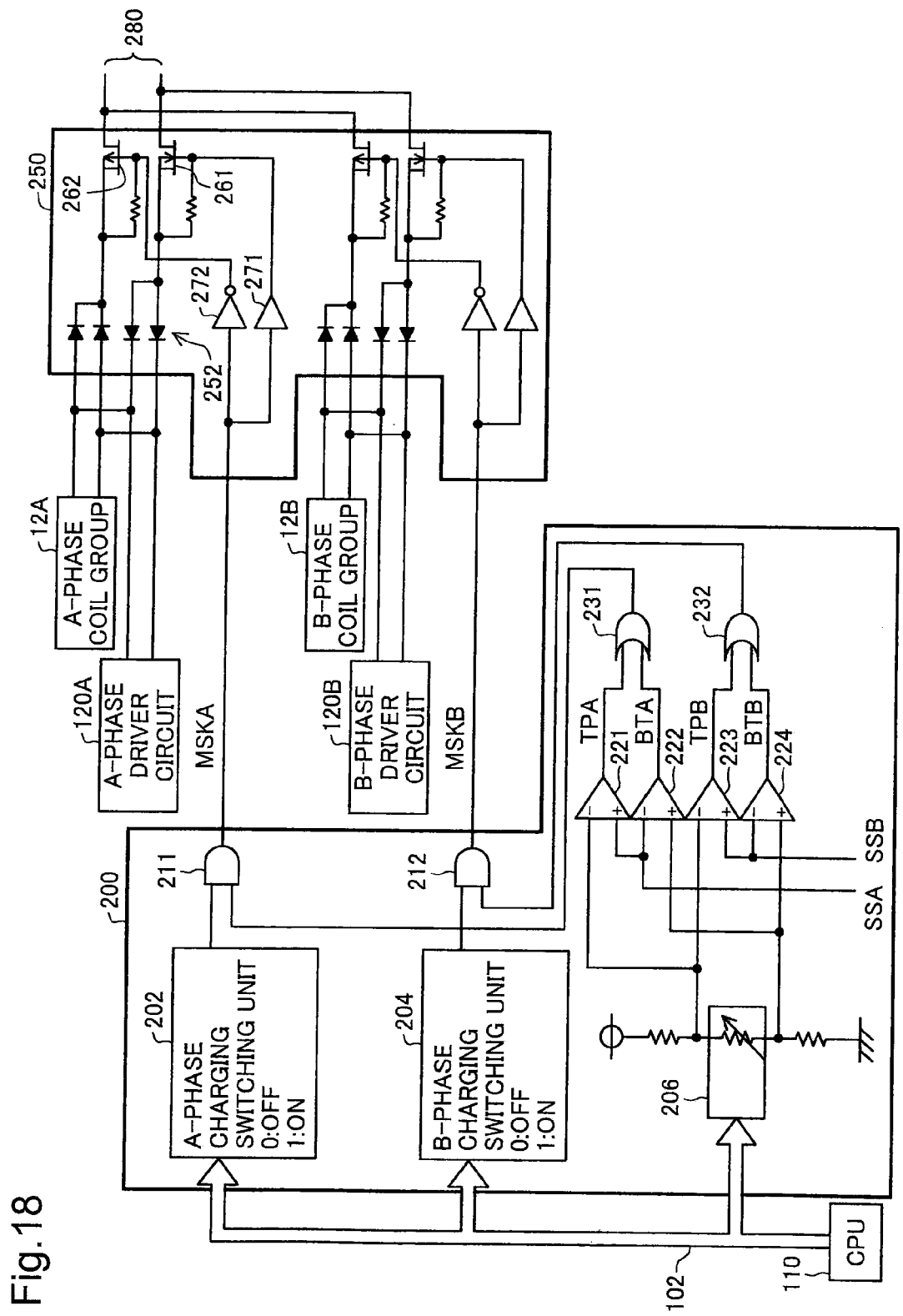
FIG. 18 illustrates internal configuration of a regeneration controller and a rectifier circuit.
Figure 19A:
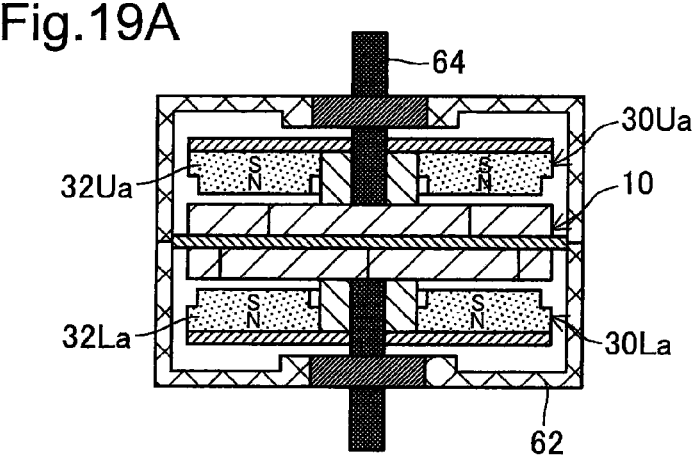
FIGS. 19A-19D illustrate motor configuration of Modification Example 1 of Embodiment 1.
Figure 19B:
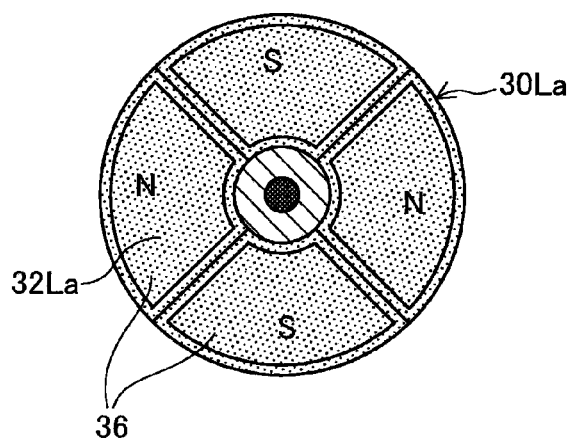
Figure 19C:
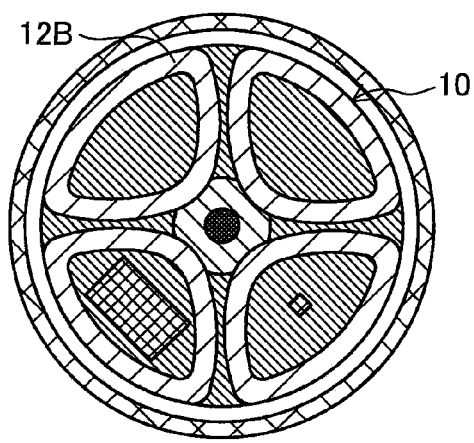
Figure 19D:
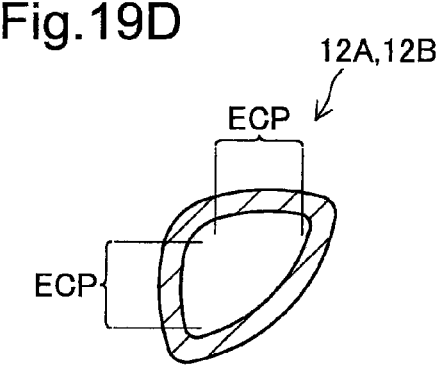

FIG. 18 illustrates the internal configuration of the regeneration controller 200 and rectifier circuit 250 shown in FIG. 7. The regeneration controller 200 comprises an phase A charge switching unit 202 and a phase B charge switching unit 204, both connected to the bus 102, and an electronically variable resistor 206. The output signals of the two charge switching units 202, 204 are applied to the input terminals of the two AND circuits 211, 212.

The phase A charge switching unit 202 outputs a signal of a "1" level when the regenerative power from the phase A coils 12A is recovered, and outputs a signal of a "0" level when the power is not recovered. The same is true for the phase B charge switching unit 204. The switching of those signal levels is conducted with the CPU 110. The presence or absence of regeneration from the phase A coils 12A and the presence or absence of regeneration from the phase B coil 12B can be set independently. Therefore, for example, electric power can be regenerated from the phase B coils 12B, while generating a drive force in the motor by using the phase A coils 12A.

The drive controller 100, similarly, may have a configuration such that whether or not the drive force is generated by using the phase A coils 12A and whether or not the drive force is generated by using the phase B coils 12B can be set independently. In such a case, the motor can be operated in an operation mode such that a drive force is generated in any one of the two sets of coils 12A, 12B, while electric power is regenerated in the other coils.

The voltage across the electronically variable resistor 206 is applied to one of the two input terminals of the four voltage comparators 221-224. The phase A sensor signal SSA and phase B sensor signal SSB are applied to the other input terminal of the voltage comparators 221-224. The output signals TPA, BTA, TPB, BTB of the four voltage comparators 221-224 can be called "mask signals" or "permission signals".

The mask signals TPA, BTA for the phase A coils are inputted into the OR circuit 231, and the mask signals TPB, BTB for the phase B are inputted into the other OR circuit 232. The outputs of those OR circuits 231, 232 are supplied to the input terminals of the above-mentioned two AND circuits 211, 212. The output signals MSKA, MSKB of those AND circuits 211, 212 are called "mask signals" or "permission signals".

The configurations of the four voltage comparators 221-224 and the two OR circuits 231, 232 are identical to two sets of the voltage comparators 594, 596, and the OR circuit 598 of the excitation interval setting unit 590 shown in FIG. 14A. Therefore, the output signal of the OR circuit 231 for the phase A coils is similar to the excitation interval signal Ea shown in FIG. 14B. Further, when the output signal of the phase A charge switching unit 202 is at a "1" level, the mask signal MSKA outputted from the AND circuit 211 for the phase A coils is identical to the output signal of the OR circuit 231. Those operations are identical to those relating to the phase B.

The rectifier circuit 250 has the circuitry for the phase A coils which includes a full-wave rectifier circuit 252 comprising a plurality of diodes, two gate transistors 261, 262, a buffer circuit 271, and an inverter circuit 272 (NOT circuit). The identical circuitry is also provided for the phase B. The gate transistors 261, 262 are connected to the power wiring 280 for regeneration.

During power regeneration, the AC power generated in the phase A coils 12A is rectified with the full-wave rectifier circuit 252. The mask signal MSKA for the phase A coils and the inverted signal thereof are supplied to the gates of the gate transistors 261, 262, and the gate transistors 261, 262 are ON/OFF controlled accordingly. Therefore, within a period in which at least one of the mask signals TPA, BTA outputted from the voltage comparators 221, 222 is at an H level, the regenerated power is outputted to the power source wiring 280. On the other hand, within an interval in which both mask signals TPA, BTA are at an L level, power regeneration is inhibited.

As clearly follows from the explanation provided hereinabove, the regenerated power can be recovered by using the regeneration controller 200 and rectifier circuit 250. Furthermore, the regeneration controller 200 and rectifier circuit 250 can restrict the interval in which the regenerated power from the phase A coils 12A and phase B coils 12B is recovered, according to the mask signal MSKA for the phase A coils and the mask signal MSKB for the phase B coils, thereby making it possible to adjust the quantity of the regenerated power.

The brushless motor of Embodiment 1 employs a configuration in which a plurality of electromagnetic coils are sandwiched from opposite sides by permanent magnets as described before, whereby the magnetic field at the electromagnetic coils can be strengthened, and efficiency can be increased.

C. Modification Example of Motor Configuration of Embodiment 1

FIGS. 19A-19D illustrate the configuration of a brushless motor in a first modification example of Embodiment 1. The rotor portions 30Ua, 30La of this brushless motor are respectively furnished with salient portions 36 (FIG. 19B) which project towards the stator portion 10 at the center portion of the permanent magnets 32Ua, 32Ub. The configuration is otherwise the same as the motor shown in FIGS. 1A-1D. The salient portions 36 at the center of the permanent magnets 32Ua, 32Ub have width equivalent to the effective coil portion ECP of the coils 12A, 12B shown in FIG. 19D. The effective coil portion ECP of the coils 12A, 12B is that coil section which generates effective driving force. Other coil sections generate substantially no driving force (in a rotary motor, force in the direction of rotation). Accordingly, the magnetic field of the magnets can be put to more effective use by providing the permanent magnets with salient portions 36 of substantially the same width as the effective coil portion ECP.

Figure 20A:
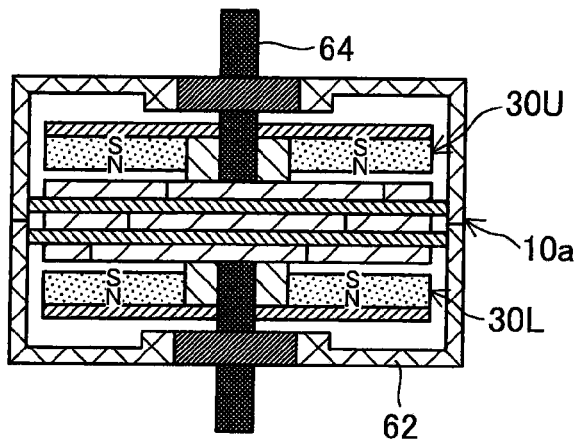
FIGS. 20A-20D illustrate motor configuration of Modification Example 2 of Embodiment 1.
Figure 20B:
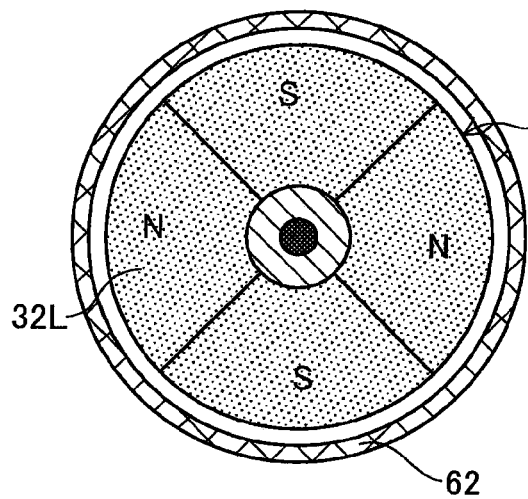
Figure 20C:
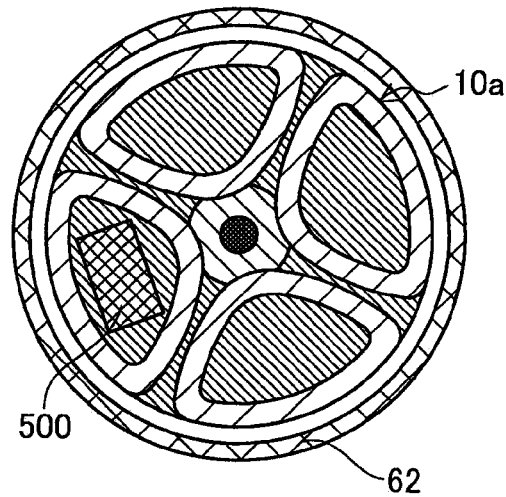
Figure 20D:
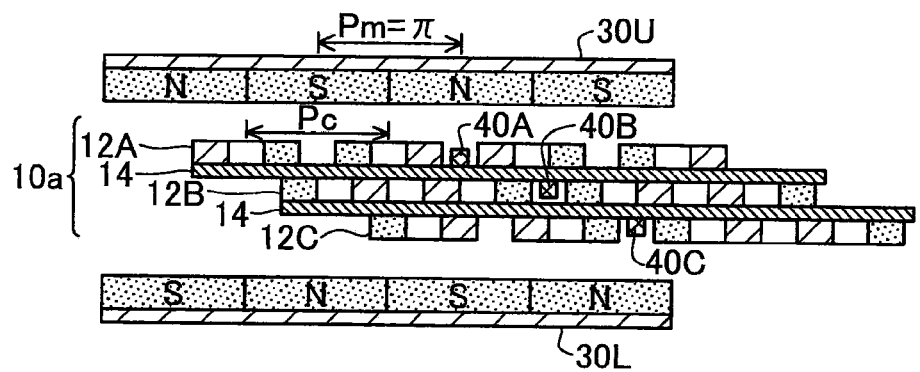

FIGS. 20A-20D illustrate the configuration of a three-phase brushless motor as a second modification example of Embodiment 1. This brushless motor differs from the motor depicted in FIGS. 1A-1D in that the stator portion 10a has three coils; the configuration of the rotor portions 30U, 30L is the same as in FIGS. 1A-1D. As shown in FIG. 20D, the stator portion 10a has a three-layer structure composed of phase A coils 12A, phase B coils 12B, and phase C coils 12C. The coils 12A, 12B, 12C of these three phases are arranged at phase differential of $2\pi/3$. The phase A sensor 40A is situated at a center location between two of the phase A coils 12A. Similarly, the phase B sensor 40B is situated at a center location between two of the phase B coils 12B; and the phase C sensor 40C is situated at a center location between two of the phase C coils 12C. It is not necessary for the coils for the three phases to have a three-layer structure, and it would be possible for them to be placed in a single-layer structure (i.e. on the same plane). However, employing a three-layer structure means that more coils can be arranged, which has the advantage of being able to generate higher torque.

Figure 21A:
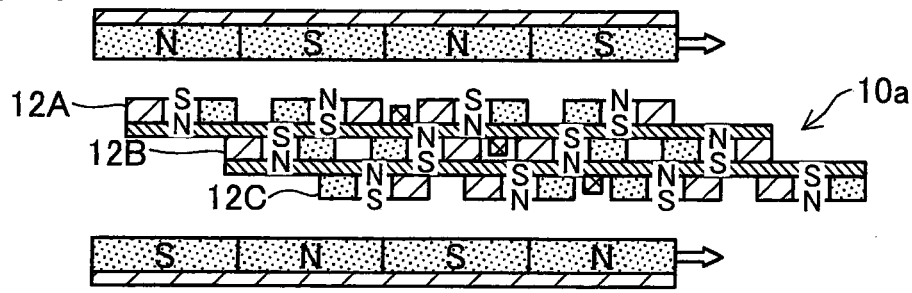
FIGS. 21A-21C illustrate forward rotation operation of a three-phase brushless motor.
Figure 21B:
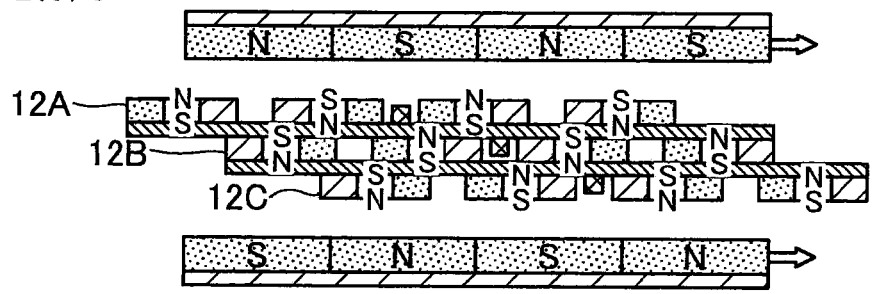
Figure 21C:
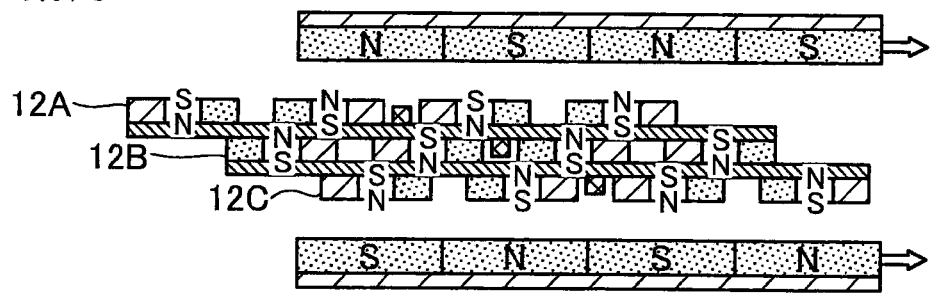

FIGS. 21A-21C are illustrations depicting forward rotation operation of the brushless motor of FIGS. 20A-20D. FIGS. 21A-21C respectively depict states just before the phase goes to 0, $2\pi/3$, and $4\pi/3$. It is common knowledge that under three-phase driving, the excitation direction of any phase will reverse at intervals of $\pi/3$. Description of reverse rotation operation of the three-phase brushless motor will not be discussed here.

Figure 22B:
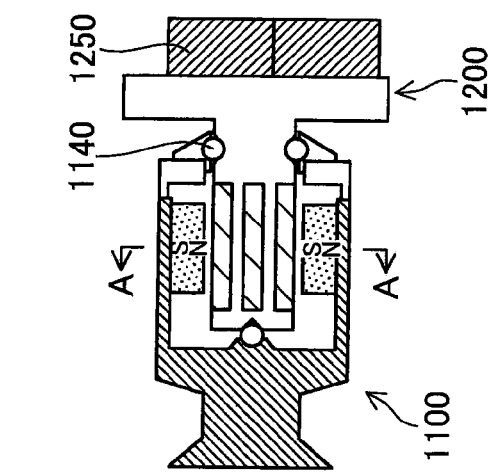
FIGS. 22A and 22B illustrate a configuration of a linear motor of Modification Example 3 of Embodiment 1.
Figure 22A:
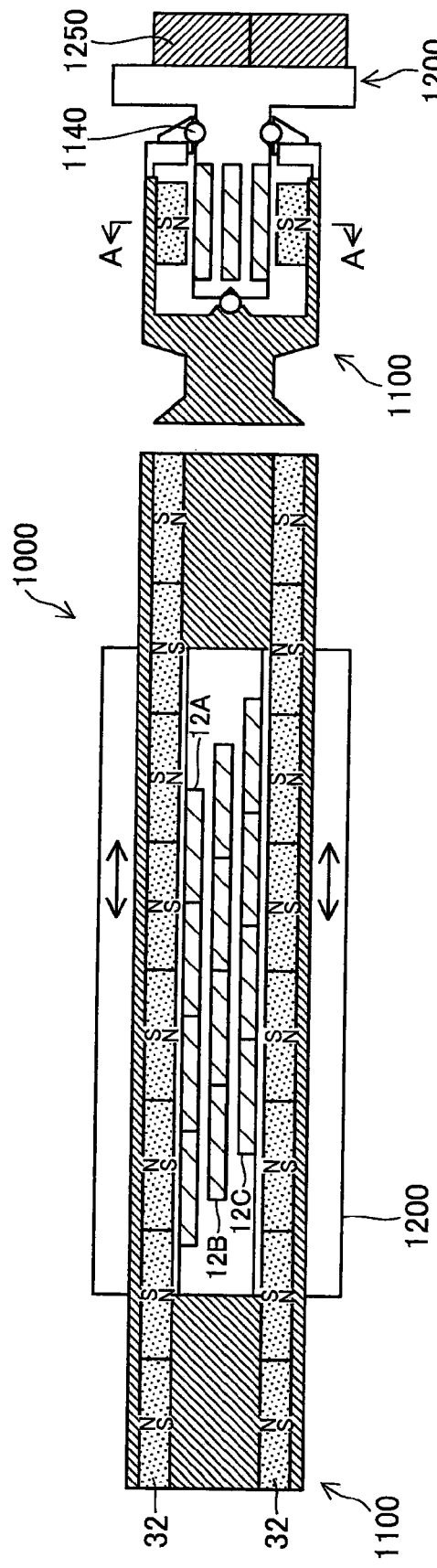

FIGS. 22A and 22B show the configuration of a three-phase linear motor as a third modification example of Embodiment 1. This linear motor 1000 includes a fixed guide portion 1100 and a moving portion 1200. As shown in FIG. 22A, a large number of permanent magnets 32 are arrayed along the direction of movement in the upper and lower portions of the fixed guide portion 1100. The moving portion 1200 is disposed at a location sandwiching the permanent magnets in the vertical direction, and is furnished with coils 12A, 12B, 12C for three phases. Magnetic sensors are disposed between adjacent coils of each phase, but have been omitted from the illustration here. As shown in FIG. 22B, the moving portion 1200 is furnished with a drive controller 1250. The drive controller 1250 has an independent power supply (not illustrated) such as a fuel cell. The moving portion 1200 is slidably retained on the fixed guide portion 1100 by a bearing portion 1140. The present invention may be embodied in such a linear motor as well. It is also possible for the linear motor to be configured as a two-phase motor.

D. Overview of Motor Configuration and Operation of Embodiment 2

Figure 23A:
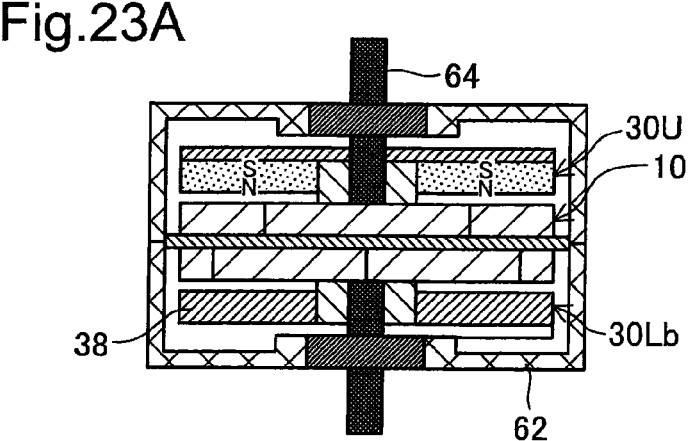
FIGS. 23A-23D are sectional views depicting a configuration of the motor unit of an electric motor pertaining to Embodiment 2.
Figure 23B:
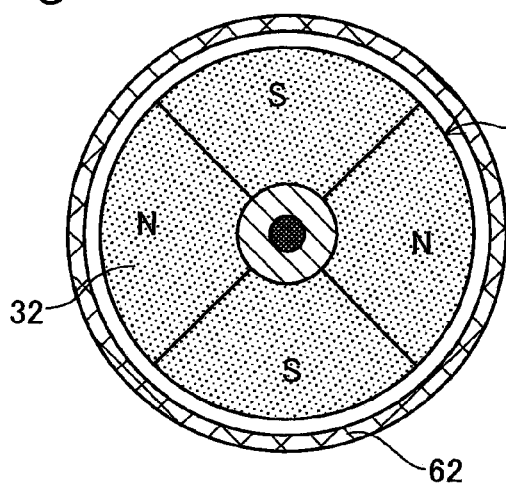
Figure 23C:
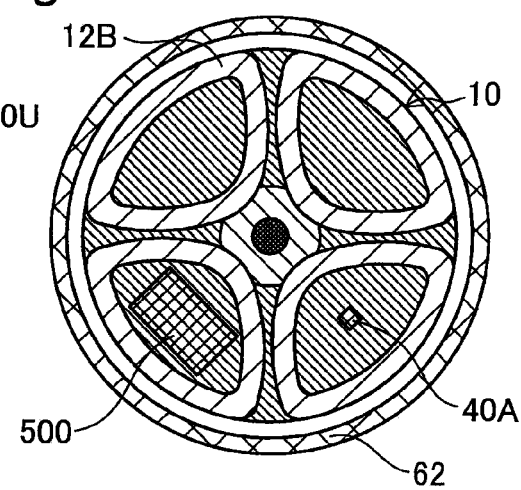
Figure 23D:
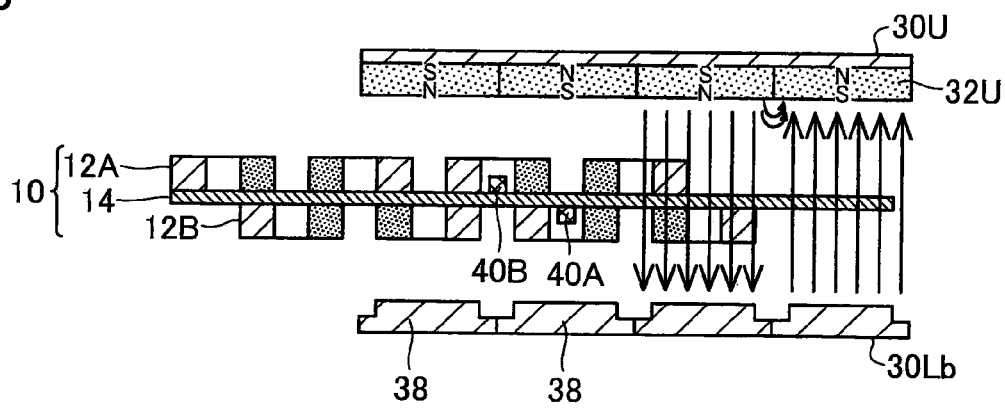
Figure 24A:
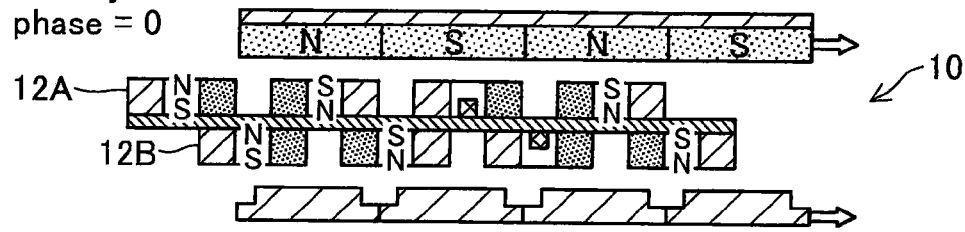
FIGS. 24A-24D illustrate forward rotation operation of the brushless motor of Embodiment 2.
Figure 24B:
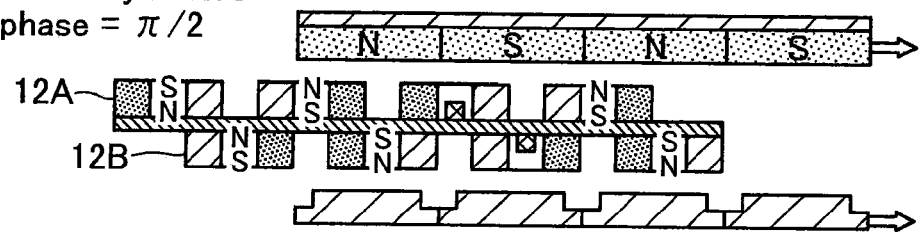
Figure 24C:
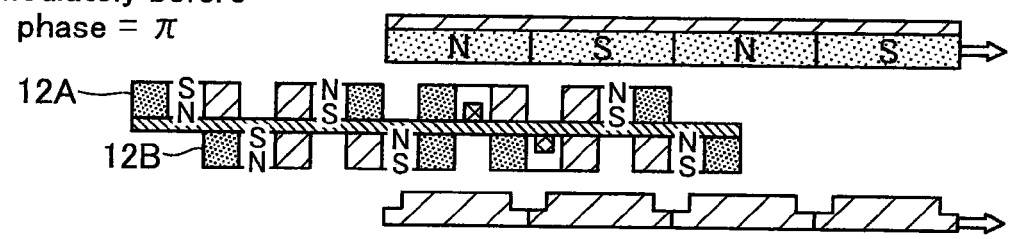
Figure 24D:
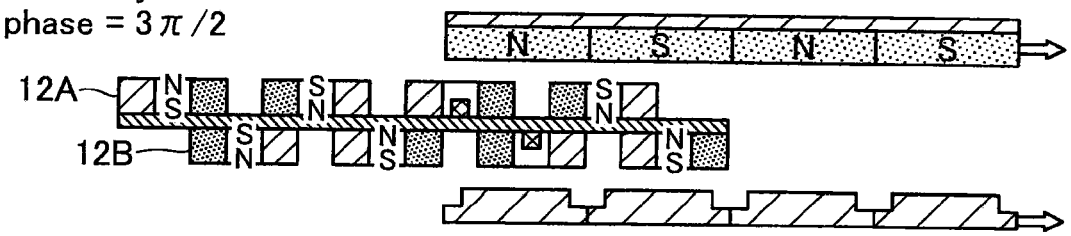

FIGS. 23A-23D depict in sectional view the configuration of the motor unit of a brushless motor pertaining to a second embodiment of the present invention. In this motor unit the configuration of the lower rotor portion 30L has been modified from that of the motor shown in FIGS. 1A-1D, but the configuration is otherwise the same as in FIGS. 1A-1D. As shown in FIGS. 23A and 23D, the lower rotor portion 30Lb is furnished with magnetic yokes 38 formed of ferromagnetic material in place of permanent magnets. These magnetic yokes 38 function to strengthen the magnetic field produced by the permanent magnets 32 of the upper rotor portion 30U (particularly the magnetic field at the location of the stator portion 10).

As will be apparent from Embodiments 1 and 2, it is possible to dispose permanent magnets to one of the two sides of the coils, and to dispose to the other side magnetic field strengthening members which in conjunction with the permanent magnets act to strengthen the magnetic field at the coil locations. In Embodiment 1 depicted in FIGS. 1A-1D, the permanent magnets 32L function as the magnetic field strengthening members, while in Embodiment 2 depicted in FIGS. 23A-23D, the magnetic yokes 38 function as the magnetic field strengthening members. With these configurations, since the magnetic field is strengthened at the coil locations, utilization efficiency of the magnetic field in the brushless motor can be increased and motor efficiency can be improved.

The magnetic yokes 38 may be provided in equal number with the permanent magnets 32U at locations facing the individual permanent magnets 32U as shown in FIG. 23D; or a magnetic yoke of tabular shape able to face multiple permanent magnets may be used. In the latter case, it would be possible to use a single yoke member of planar shape as the magnetic field strengthening member for multiple permanent magnets. In preferred practice, the magnetic yokes 38 will have salient portions at locations facing the individual permanent magnets 32U, as shown in FIG. 23D.

FIGS. 24A-24D illustrate forward rotation operation of the brushless motor of Embodiment 2. FIGS. 24A-24D respectively depict states where the phase has reached just before 0, π/2, it, and 3/π2. This operation is basically the same as that depicted in FIGS. 4A-4D. Reverse rotation operation is also similar to that depicted in FIGS. 5A-5D.

Figure 25:
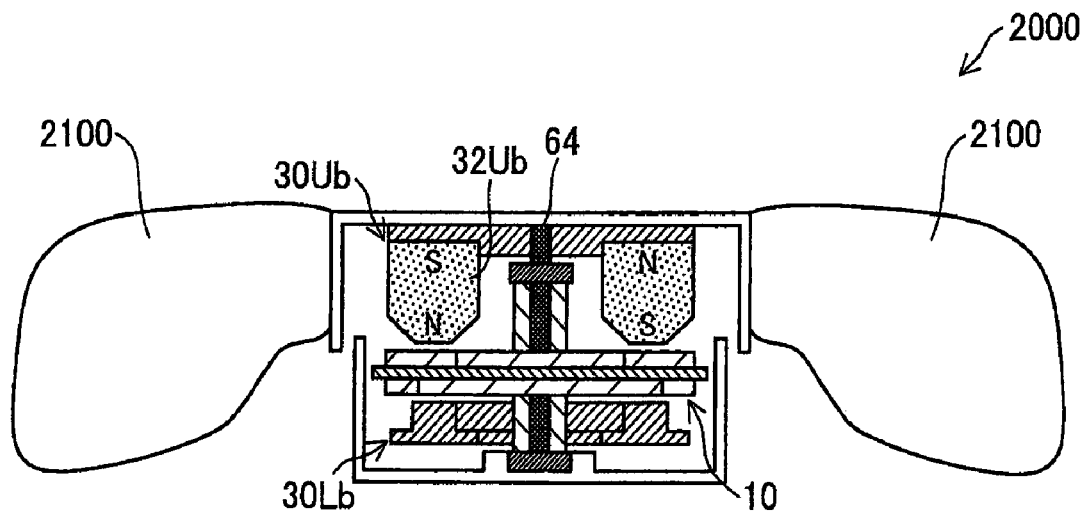
FIG. 25 illustrates motor configuration of Modification Example 1 of Embodiment 2.

FIG. 25 is an illustration depicting the motor configuration of a first modification example of Embodiment 2. This brushless motor 2000 is configured as a fan motor. Specifically, fan blades 2100 are fastened to the outside peripheral section of the upper rotor portion 30Ub. The permanent magnets 32Ub of the upper rotor portion 30Ub have a salient portion which projects towards the stator portion 10. As discussed in FIGS. 22A-22D, the salient portion is a device for further improving motor efficiency.

The brushless motor of Embodiment 2 can be reduced to practice as the three-phase motor depicted in FIGS. 20A-20D, or as the linear motor depicted in FIGS. 22A and 22B.

In the linear motor of FIGS. 22A-22B, the component furnished with the magnetic coils moves, while the component furnished with the permanent magnets is stationary. This relationship is the reverse of the configurations depicted in FIGS. 1A-1D and FIG. 25. Specifically, in the motor depicted in FIGS. 1A-1D, the component furnished with the electromagnetic coils (i.e. the stator portion 10) is stationary, while the components furnished with the permanent magnets (or with the magnetic yokes 38) (i.e. the rotor portions 30U, 30L) move. As will be understood from these examples, the electric machine according to the embodiment of the present invention may be reduced to practice as any of various kinds of electric machine whose configuration includes a first member furnished with permanent magnets (also termed a "first drive member"), a second member furnished with electromagnetic coils (also termed a "second drive member"), and a third member furnished with magnetic field strengthening members (permanent magnets 32L or magnetic yokes 38) (also termed a "third drive member"), and in which the first and third drive members can move together relative to the second drive member.

E. Modification Examples

The present invention is not limited by the embodiments set forth hereinabove by way of illustration, and various other embodiments such as the following are possible within the scope and spirit thereof.

E1. Modification Example 1

While the preceding embodiments described a two-phase brushless motor and a three-phase brushless motor, it is possible to implement the present invention in a brushless motor having any number M of phases where M is an integer equal to 1 or greater. For example the invention may be implemented in a single-phase motor. A single-phase motor may be achieved by eliminating the coils for one phase from the coils for two phases in the motor of FIGS. 1A-1D, for example. While it is sufficient for the coils of each phase to include at least one electromagnetic coil, it is preferable that coils for one phase include two or more electromagnetic coils.

E2. Modification Example 2

While analog magnetic sensors are employed in the preceding embodiments, it is possible to use digital magnetic sensors having multivalue analog-like output in place of analog magnetic sensors. Both an analog magnetic sensor and a digital magnetic sensor having multivalue analog-like output will have an output signal exhibiting analog variation. Herein, an "output signal exhibiting analog variation" refers in the broad sense to include both analog output signals, and multilevel digital output signals having three or more levels, excluding On/Off binary output.

It is also acceptable to use a digital magnetic sensor having binary digital output instead of a sensor having an output signal exhibiting analog variation. In this case, the AD converter 570 and the excitation interval setting unit 590 of FIG. 9A will not be necessary. Consequently, it will be possible to realize the drive control circuit by means of an inexpensive IC, at the cost of lower efficiency and possible occurrence of noise/vibration due to failure to set the excitation period or to use a sine wave drive waveform.

E3. Modification Example 3

It is possible to employ as the PWM circuit various circuit configurations besides that shown in FIG. 11. For example, it is possible to utilize a circuit that performs PWM control by comparing sensor output with a triangular reference wave. Moreover, the drive signal may be generated by some method besides PWM control. It is also possible to employ a circuit that generates drive signals by some method besides PWM control. For example, a circuit that amplifies sensor output to generate an analog drive signal may be used.

In FIG. 9A, the AD converter 570 may be replaced with a voltage comparator. In this case, the drive waveform will be rectangular rather than a sine wave drive waveform, and thus noise/vibration will occur; on the other hand, it will be possible to realize the drive control circuit by means of an inexpensive IC.

E4. Modification Example 4

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 27:
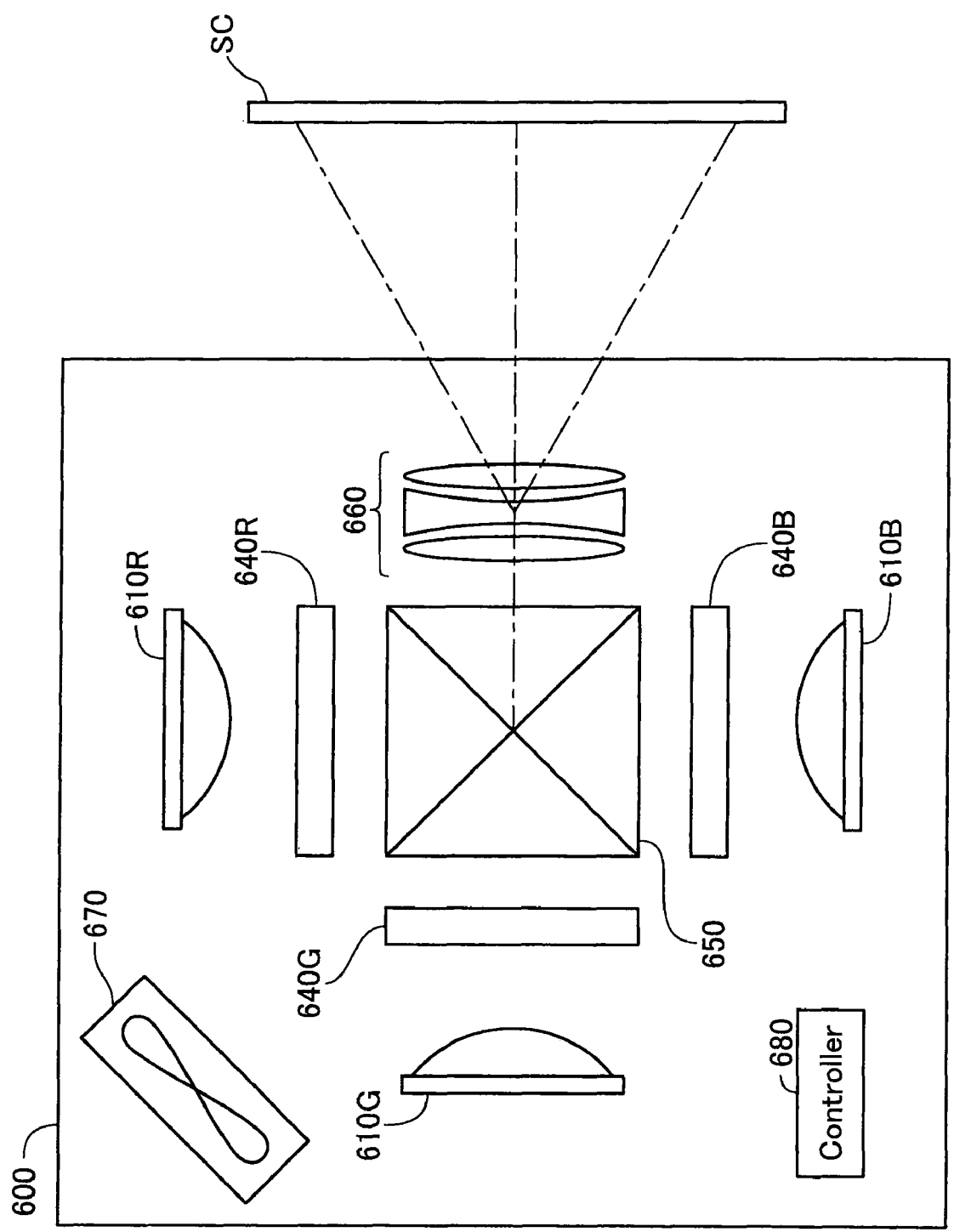
FIG. 27 illustrates a projector that utilizes a motor according to an embodiment of the present invention.

FIG. 27 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 28A:
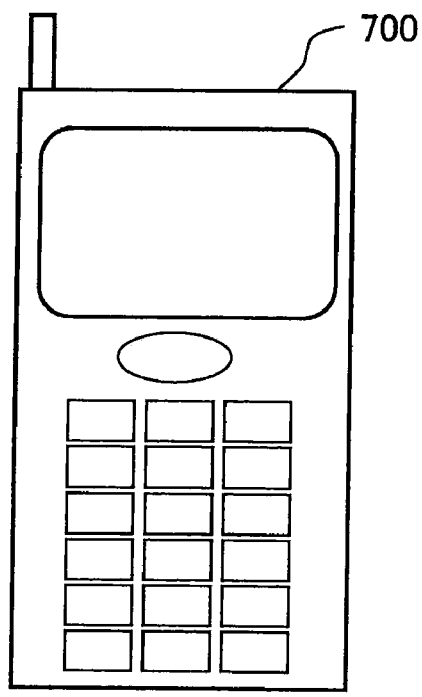
FIGS. 28A-28C illustrate a fuel cell type mobile phone that utilizes a motor according to an embodiment of the present invention.
Figure 28B:
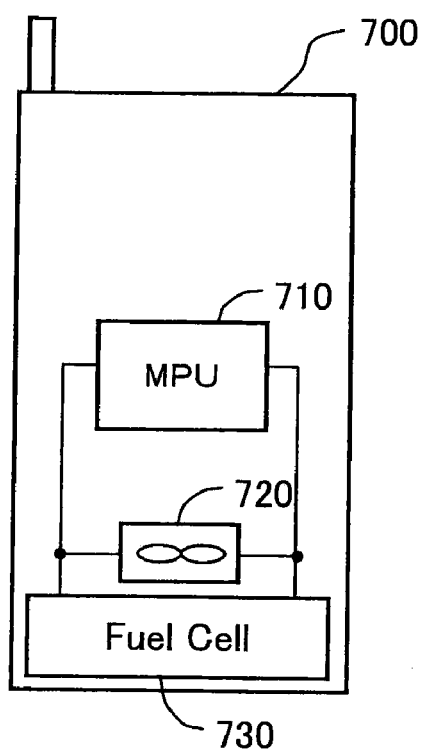
Figure 28C:
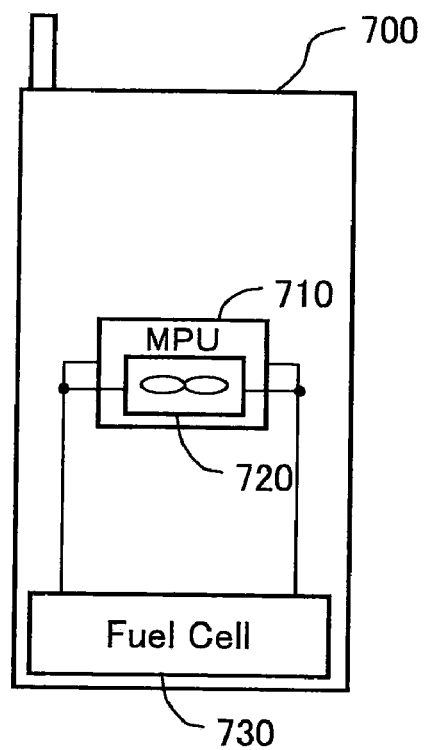

FIGS. 28A-28C illustrate a mobile phone utilizing a motor according to the present invention. FIG. 28A shows the external view of a mobile phone 700, and FIG. 28B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 28C, to cool the MPU 710. Various rotation type brushless motors described above can be used as the motor for driving the fan 720.

Figure 29:
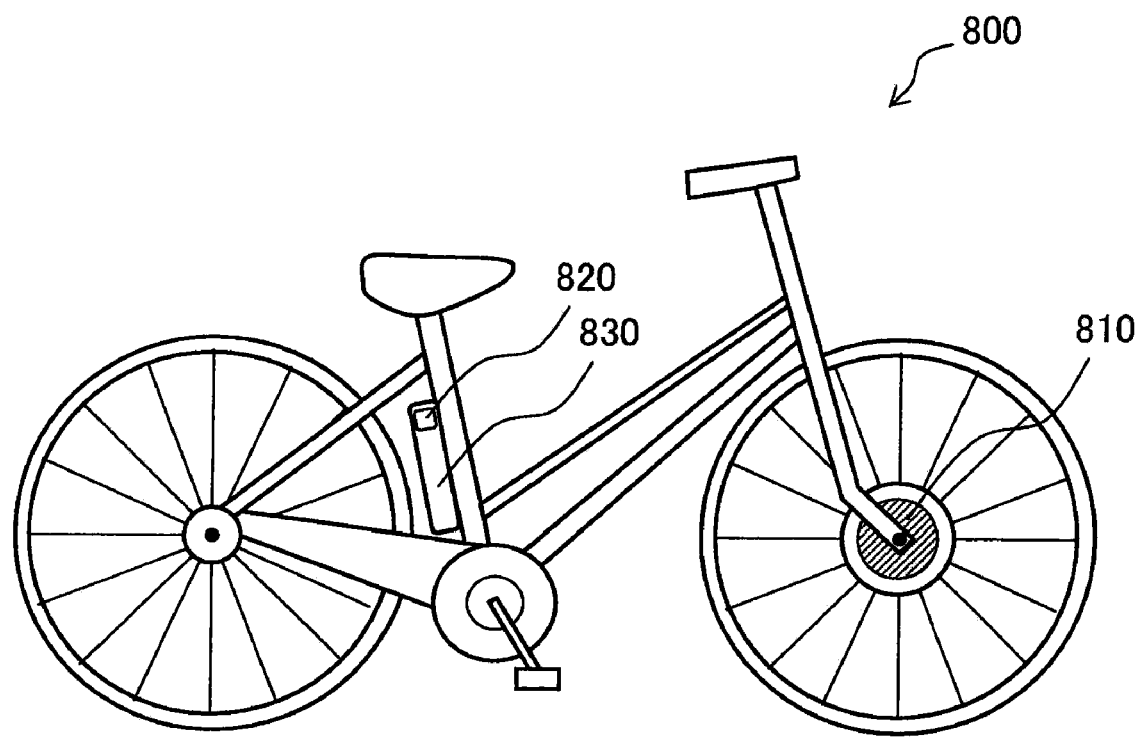
FIG. 29 illustrates an electrically powered bicycle (electric power assisted bicycle) as an example of a moving body utilizing motor/generator according to an embodiment of the present invention.

FIG. 29 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 30:
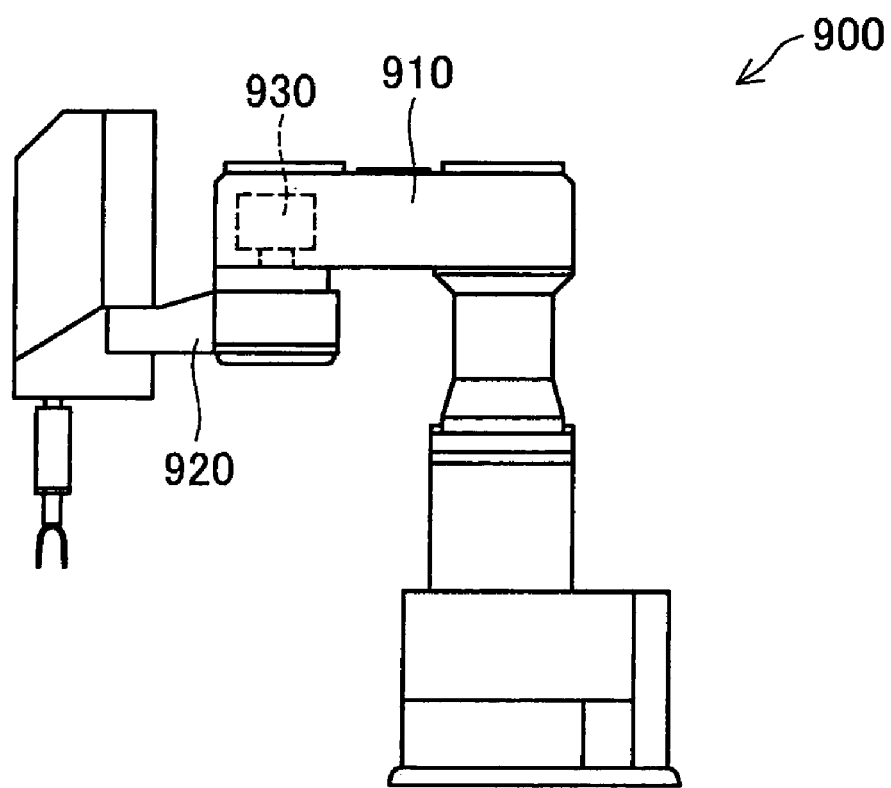
FIG. 30 illustrates an example of a robot that utilizes a motor according to an embodiment of the present invention.

FIG. 30 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A brushless electric machine, comprising:
   a first drive member having Q permanent magnets where Q is an integer;
   a second drive member having a first face, a second face, and a plurality of electromagnetic coils, and capable of movement relative to the first drive member, the first drive member being separated from and opposite to the first face of the second drive member;
   a third drive member having a fixed relative positional relationship with the first drive member, the third drive member being separated from and opposite to the second face of the second drive member;
   a magnetic sensor, disposed on the second drive member, for detecting relative position of the first and second drive members; and
   a control circuit for controlling operation of the brushless electric machine, based on an output signal of the magnetic sensor;
   wherein the third drive member has at locations facing the permanent magnets of the first drive member a plurality of magnetic field strengthening members for strengthening the magnetic field at the location of the second drive member in conjunction with the permanent magnets;
   wherein the plurality of electromagnetic coils have two coil groups for two phases including a first coil group and a second coil group, each coil group including N electromagnetic coils, where N is an integer equal to or greater than 1;
   the first coil group is disposed on the first face of the second drive member but not on the second face,
   the second coil group is disposed on the second face of the second drive member but not on the first face,
   the first coil group and the second coil group are disposed with a phase difference of $\pi/2$ between each other,
   the control circuit drives the two coil groups with a phase difference of $\pi/2$ such that the two coil groups simultaneously generate a driving force; and
   the number Q of permanent magnets is equal to the number N of electromagnetic coils of each coil group.

2. The brushless electric machine according to claim 1, wherein the magnetic field strengthening members are permanent magnets.

3. The brushless electric machine according to claim 1, wherein the magnetic field strengthening members are ferromagnetic bodies.

4. The brushless electric machine according to claim 1, wherein each permanent magnet has a projecting portion which projects towards the second drive member.

5. The brushless electric machine according to claim 1, wherein
   the magnetic sensor outputs an output signal exhibiting analog change depending on relative position of the first and second drive members.

6. The brushless electric machine according to claim 5, wherein
   the control circuit includes a PWM control circuit for generating a drive signal which simulates the analog change of the output signal of the magnetic sensor, through execution of PWM control utilizing the analog change of the output signal of the magnetic sensor.

7. The brushless electric machine according to claim 1, wherein
   the control circuit includes a regeneration circuit for regenerating power from the magnetic coils.

8. An apparatus, comprising:
   a brushless machine according to claim 1; and
   a driven member driven by the brushless machine.

9. A moving body comprising a brushless machine according to claim 1.

* * * * *